(12) United States Patent
Nagaoka

(10) Patent No.: US 6,536,323 B2
(45) Date of Patent: Mar. 25, 2003

(54) COLUMN PACKING AND METHOD FOR MANUFACTURING THE SAME

(76) Inventor: Tadayoshi Nagaoka, 573-2, Oaza Ureshi, Tondabayashi-shi, Osaka-fu (JP)

(*) Notice: Subject to any disclaimer, the term of this patent is extended or adjusted under 35 U.S.C. 154(b) by 0 days.

(21) Appl. No.: 10/087,267

(22) Filed: Oct. 25, 2001

(65) Prior Publication Data

US 2002/0092414 A1 Jul. 18, 2002

Related U.S. Application Data

(62) Division of application No. 09/557,518, filed on Apr. 25, 2000.

(30) Foreign Application Priority Data

Apr. 27, 1999 (JP) .............................................. 11-119213
Feb. 22, 2000 (JP) ........................................ 2000-044241

(51) Int. Cl.⁷ ................................................ D04C 1/00
(52) U.S. Cl. ............................................................ 87/3
(58) Field of Search ............................ 87/1–13, 24, 27, 87/53, 62; 428/52, 53, 81

(56) References Cited

U.S. PATENT DOCUMENTS 3,686,381 A * 8/1972 Fairbanks ................... 264/103

2002/0020283 A1 * 2/2002 Uchida et al. .................. 87/11

FOREIGN PATENT DOCUMENTS

JP 3130445 A * 6/1991

* cited by examiner

Primary Examiner—John J. Calvert
Assistant Examiner—Shaun R Hurley
(74) Attorney, Agent, or Firm—Hedman & Costigan, P.C.

(57) ABSTRACT

A method for manufacturing a packing made of a three-dimensional net-like structure which constitutes an internal structure of device which performs material transfer, heat exchange or mixing between gases, liquids or gas and liquid, the internal structure being divided in a plurality of chambers or channels connected to one another is provided. The three-dimensional net-like structure is made of a plurality of unit structures which are arranged continuously in vertical and horizontal directions of the three-dimensional net-like structure. Each of the unit structures is formed by conversion and dispersion of three or four line elements. The method comprises a step of forming a conversion section of the unit structure where the three or four line elements converge by twisting the three or four line elements together.

4 Claims, 31 Drawing Sheets

TO ROTATION CONTROLLER 28

COLUMN PACKING AND METHOD FOR MANUFACTURING THE SAME

This application is a divisional application of Ser. No. 09/557,518, filed Apr. 25, 2000 which claims the priority under 35 U.S.C. §119 of Japanese Applications Serial Nos. 119213/1999, filed Apr. 27, 1999 and 044241/2000, filed Feb. 22, 2000.

BACKGROUND OF THE INVENTION

This invention relates to a column packing filled in a device which is divided in a plurality of chambers or channels connected to one another and performs material transfer, heat exchange or mixing between gases, liquids or gas and liquid. The invention relates also to a method for manufacturing such column packing.

Japanese Patent Application Laid-open Publication No. Hei 3-203976 discloses a column packing of this type. This column packing is made up of a plurality of permeable sheets which are disposed in parallel to one another and extend in the direction of a main stream of fluid. Projecting portions of these permeable sheets are disposed in the direction that crosses the main stream of fluid and these projections function as spacers between the adjacent permeable sheets. This packing (hereinafter referred to as "X-packing" because the cross section of a joint portion between two adjacent permeable sheets assumes the shape of the letter X) is beneficial in that fluid flowing down along the permeable sheets is repeatedly joined, mixed, horizontally dispersed and redistributed at each joint of the permeable sheets. Thus, fluid flow which was not uniform when it was charged in the device gradually becomes uniform resulting in an optimum material transfer or heat exchange. Moreover, gas charged in the device passes through the liquid flowing along the inclined surfaces of the permeable sheets and necessary contact between the gas and the liquid is achieved by contacting the gas with the liquid while the gas passes through the permeable sheets, so that material transfer or heat exchange can be effected efficiently with a minimum pressure loss.

For manufacturing this X-packing, the inventor of this application proposed the method described in U.S. Pat. No. 5,673,726. According to this method, as shown in FIG. 22, permeable sheets 51 in plural layers and joints 51b of adjacent permeable sheets 51 are simultaneously produced and a three-dimensional woven packing 50 thereby is produced.

In a case where this X-packing manufactured by the above described prior art method is used as a packing loaded in, e.g., a gas-liquid mixing device, the packing 50 of FIG. 22 is erected in the device and liquid from a distributor is caused to flow from the top to the bottom, i.e., in the direction of arrow A. It is, however, actually difficult to maintain the packing 50 strictly horizontally in the device by reason of an error in installation or other causes and, as a result, the threads that run crosswise of the separated portions 51a and the joints 51b of the packing 50 are disposed in a somewhat inclined relationship to the horizontal direction. For this reason, when the operation of the device is started and liquid is caused to flow in the direction of the arrow A, the liquid flows concentrically along a lower portion of the threads that run crosswise with the result that collection, horizontal distribution and downward redistribution of the liquid are not performed uniformly but flow of the liquid tends to concentrate on the lower portion of the inclined threads running corsswise.

It is, therefore, an object of the invention to provide an X-packing capable of accurately achieving uniform collection and redistribution of liquid at joints of the X-packing.

It is another object of the invention to provide a method for manufacturing such X-packing at a low cost and in a large scale.

SUMMARY OF THE INVENTION

For achieving the above described objects of the invention, there is provided a method for manufacturing a packing made of a three-dimensional net-like structure which constitutes an internal structure of a device which performs material transfer, heat exchange or mixing between gases, liquids or gas and liquid, said internal structure being divided in a plurality of chambers or channels connected to one another and said three-dimensional net-like structure being made of a plurality of unit structures which are arranged continuously in vertical and horizontal directions of the three-dimensional net-like structure, each of the unit structures being formed by conversion and dispersion of three line elements, said method comprising a step of forming a converging section of the unit structure where the three line elements converge by twisting the three line elements together.

According to the invention, there is also provided a method for manufacturing a packing made of a three-dimensional net-like structure which constitutes an internal structure of a device which performs material transfer, heat exchange or mixing between gases, liquids or gas and liquid, said internal structure being divided in a plurality of chambers or channels connected to one another and said three-dimensional net-like structure being made of a plurality of unit structures which are arranged continuously in vertical and horizontal directions of the three-dimensional net-like structure, each of the unit structures being formed by conversion and dispersion of three line elements, said method comprising steps of:

(A) preparing a packing manufacturing space by forming a predetermined number of hypothetical channels of a regular triangular cross-section without leaving spaces between them so that six hypothetical channels having one common apex of a triangle form a regular hexagon, said hypothetical channels consisting of hypothetical channels C1 which share one apex of a triangle but do not share a side of a triangle with adjacent hypothetical channels and hypothetical channels C2 which share a side of a triangle with the hypothetical channels C1, and disposing, in the packing manufacturing space, a plurality of rotors each having a circular shape in the radial section, being formed with three recesses in the periphery thereof at an interval of 120° for respectively receiving a line element and being connected to a rotor control unit and rotatable by a predetermined angle by operating the rotor control unit, said rotors consisting of rotors R1 each being disposed in one of the hypothetical channels C1, rotors R2 each being disposed in one of the hypothetical channels C2 and rotors R3 each being disposed in a space defined by three of the rotors R1 disposed in three of the hypothetical channels C1 which share one apex of a triangle and three of the rotors R2 disposed in three of the hypothetical channels C2, in such a manner that the line element can be moved between the recess of the rotor R3 and the recess of the rotor R1, and between the recess of the rotor R3 and the recess of the rotor R1 and that the rotors R1 do not contact the rotors R2, (B) inserting the line elements unwound from bobbins in the respective recesses of the rotors R1 and thereafter rotating the rotors R1 by one revolution or over to twist the three line elements inserted in the respective recesses of each of the rotors R1 and thereby forming a first knot K1 in each of the hypothetical channels C1 downstream of the rotors R1 in a feeding direction of the line elements, (C) feeding the line elements by a predetermined length, moving the line elements from the recesses of the rotors R1 to the recesses of the rotors R3 and thereafter rotating the rotors R3 by one revolution or over to twist the three line elements inserted in the recesses of the rotors R3 and thereby forming a second knot K2 upstream of the first knot K1 in each of the spaces in which the rotors R3 are disposed, (D) feeding the line elements by a predetermined length, rotating the rotors R3 and the rotors R2 respectively by 60° in opposite directions to each other, moving the line elements from the recesses of the rotors R3 to the recesses of the rotors R2 and thereafter rotating the rotors R2 by one revolution or over to twist the three line elements inserted in the recesses of the rotors R2 and thereby forming a third knot K3 downstream of the rotors R2 and the upstream of the second knot K2 in each of the hypothetical channels C2, (E) feeding the line elements by a predetermined length, moving the line elements from the recesses of the rotors R2 to the recesses of the rotors R3 and thereafter rotating the rotors R3 by one revolution or over to twist the three line elements inserted in the recesses of the rotors R3 and thereby forming a fourth knot K4 downstream of the rotors R3 and upstream of the third knot K3 in each of the spaces in which the rotors R3 are disposed, and (F) feeding the line elements by a predetermined length, rotating the rotors R3 and the rotors R1 respectively by 60° in opposite directions to each other and thereafter moving the line elements from the recesses of the rotors R3 to the recesses of the rotors R1.

According to the manufacturing method of the invention, a packing 21 consisting of a three-dimensional net-like structure as shown in the schematic perspective view of FIG. 1 can be produced. This packing 21 is made, as shown in the partial perspective view of FIG. 2, of a plurality of unit structures 22 which are arranged continuously in vertical and horizontal directions of the three-dimensional net-like structure, each of the unit structures 22 being formed by conversion and dispersion of three line elements. As shown in FIG. 2, this unit structure 22 is a combination of two triangular pyramids having a common apex 22a and bottom surfaces disposed in opposite directions. Three line elements 23 constitute three sides 22b of each triangular pyramid. The apex 22a of the two triangular pyramids and the sides 22b of the two triangular pyramids are formed by conversion and diversion of the three line elements 23 about a knot 24 which is formed by twisting the thee line elements 23. Accordingly, no element corresponding to the horizontal threads in the prior art X-packing is used at all in this unit structure 22.

Accordingly, by using the packing 21 manufactured by the method of the invention in a device such as a gas-liquid contact device, liquid from a distributor flows in the direction of arrow B in FIG. 1 and, since no element corresponding to the horizontal threads is used in the packing 21, the liquid which has fallen upon the top of the packing 21 does not produce a drift which is caused by flow of the liquid toward a laterally lower portion even if there is an error in installing the packing 21 in the device and, therefore, collection and downward redistribution of the liquid at the apex 22a (i.e., knot 24) of each unit structure 22 are performed uniformly.

In another aspect of the invention, there is provided a method for manufacturing a packing made of a three-dimensional net-like structure which constitutes an internal structure of a device which performs material transfer, heat exchange or mixing between gases, liquids or gas and liquid, said internal structure being divided in a plurality of chambers or channels connected to one another and said three-dimensional net-like structure being made of a plurality of unit structures which are arranged continuously in vertical and horizontal directions of the three-dimensional net-like structure, each of the unit structures being formed by conversion and dispersion of four line elements, said method comprising a step of forming a converging section of the unit structure where the four line elements converge by twisting the four line elements together.

According to the invention, there is also provided a method for manufacturing a packing made of a three-dimensional net-like structure which constitutes an internal structure of a device which performs material transfer, heat exchange or mixing between gases, liquids or gas and liquid, said internal structure being divided in a plurality of chambers or channels connected to one another and said three-dimensional net-like structure being made of a plurality of unit structures which are arranged continuously in vertical and horizontal directions of the three-dimensional net-like structure, each of the unit structures being formed by conversion and dispersion of four line elements, said method comprising steps of:

(A) preparing a packing manufacturing space by forming a predetermined number of hypothetical channels of a regular square cross-section so that these hypothetical channels align in columns and rows without leaving spaces between them, said hypothetical channels consisting of first hypothetical channels CA and second hypothetical channels CB which are disposed alternately in columns and rows of the hypothetical channels, and disposing, in the packing manufacturing space, a plurality of rotors each having a circular shape in the radial section, being formed with four recesses in the periphery thereof at an interval of 90° for respectively receiving a line element and being connected to a rotor control unit and rotatable by a predetermined angle by operating the rotor control unit, said rotors consisting of rotors RA each being disposed in one of the first hypothetical channels CA and rotors RB each being disposed in one of the second hypothetical channels CB in such a manner that the line element can be moved between the recess of the rotor RA and the recess of the rotor RB, (B) inserting the line element unwound from bobbins in the respective recesses of the rotors RA and thereafter rotating the rotors RA by one revolution or over to twist the four line elements inserted in the respective recesses of each of the rotors RA and thereby forming a first knot KCA in each of the hypothetical channels CA downstream of the rotors RA in a feeding direction of the line elements, (C) feeding the line elements by a predetermined length, moving the line elements from the recesses of the rotors RA to the recesses of the rotors RB and thereafter rotating the rotors RB by one revolution or over to twist the four line elements inserted in the recesses of the rotors RB and thereby forming a second knot KCB upstream of the first knot KCA in each of the hypothetical channels CB, and (D) feeding the line elements by a predetermined length and moving the line elements from the recesses of the rotors RB to the recesses of the rotors RA.

According to the method of the invention, a packing 40 consisting of a three-dimensional net-like structure as shown in the schematic perspective view of FIG. 3 is obtained. This packing 40 is made of a plurality of unit structures 41. The unit structure 41 is a combination of two quadruple pyramids having a common apex 41a and having bottom surfaces disposed in opposite directions. The three-dimensional net-like structure is made by arranging these unit structures 41 in vertical and horizontal directions.

In the unit structure 41, respective sides 41b consist of line elements 23. That is to say, four line elements 23 constitute four sides 41b and the apex 41a is formed by conversion and dispersion of the four line elements 23. In this unit structure 41 either, there is no element corresponding to the horizontal threads at all and, therefore, the advantageous result of the unit structure 22 can be obtained also in the unit structure 41. In other words, the liquid flows in the direction of arrow D in FIG. 3 and collection and downward redistribution of the liquid at the apex 41a of each quadruple pyramid of the unit structure 41 is performed uniformly.

The present invention can be applied not only to the column packing used in devices such as a gas-liquid mixing device but also to manufacturing of other three-dimensional net-like structure such as ones used for a mist eliminator, a multi-layer filtering film and aggregate.

In one aspect of the invention, there is provided a method for manufacturing a three-dimensional net-like structure including a mist eliminator and a multi-layer filtering film made of a plurality of unit structures which are arranged continuously in vertical and horizontal directions of the three-dimensional net-like structure, each of the unit structures being formed by conversion and dispersion of three line elements, said method comprising a step of forming a converging section of the unit structure where the three line elements converge by twisting the three line elements together.

In another aspect of the invention, there is provided a method for manufacturing a three-dimensional net-like structure including a mist eliminator and a multi-layer filtering film made of a plurality of unit structures which are arranged continuously in vertical and horizontal directions of the three-dimensional net-like structure, each of the unit structures being formed by conversion and dispersion of three line elements, said method comprising steps of:

(A) preparing a three-dimensional net-like structure manufacturing space by forming a predetermined number of hypothetical channels of a regular triangular cross-section without leaving spaces between them so that six hypothetical channels having one common apex of a triangle form a regular hexagon, said hypothetical channels consisting of hypothetical channels C1 which share one apex of a triangle but do not share a side of a triangle with adjacent hypothetical channels and hypothetical channels C2 which share a side of a triangle with the hypothetical channels C1, and disposing, in the three-dimensional net-like structure manufacturing space, a plurality of rotors each having a circular shape in the radial section, being formed with three recesses in the periphery thereof at an interval of 120° for respectively receiving a line element and being connected to a rotor control unit and rotatable by a predetermined angle by operating the rotor control unit, said rotors consisting of rotors R1 each being disposed in one of the hypothetical channels C1, rotors R2 each being disposed in one of the hypothetical channels C2 and rotors R3 each being disposed in a space defined by three of the rotors R1 disposed in three of the hypothetical channels C1 which share one apex of a triangle and three of the rotors R2 disposed in three of the hypothetical channels C2, in such a manner that the line element can be moved between the recess of the rotor R3 and the recess of the rotor R1, and between the recess of the rotor R3 and the recess of the rotor R1 and that the rotors R1 do not contact the rotors R2, (B) inserting the line elements unwound from bobbins in the respective recesses of the rotors R1 and thereafter rotating the rotors R1 by one revolution or over to twist the three line elements inserted in the respective recesses of each of the rotors R1 and thereby forming a first knot K1 in each of the hypothetical channels C1 downstream of the rotors R1 in a feeding direction of the line elements, (C) feeding the line elements by a predetermined length, moving the line elements from the recesses of the rotors R1 to the recesses of the rotors R3 and thereafter rotating the rotors R3 by one revolution or over to twist the three line elements inserted in the recesses of the rotors R3 and thereby forming a second knot K2 upstream of the first knot K1 in each of the spaces in which the rotors R3 are disposed, (D) feeding the line elements by a predetermined length, rotating the rotors R3 and the rotors R2 respectively by 60° in opposite directions to each other, moving the line elements from the recesses of the rotors R3 to the recesses of the rotors R2 and thereafter rotating the rotors R2 by one revolution or over to twist the three line elements inserted in the recesses of the rotors R2 and thereby forming a third knot K3 downstream of the rotors R2 and the upstream of the second knot K2 in each of the hypothetical channels C2, (E) feeding the line elements by a predetermined length, moving the line elements from the recesses of the rotors R2 to the recesses of the rotors R3 and thereafter rotating the rotors R3 by one revolution or over to twist the three line elements inserted in the recesses of the rotors R3 and thereby forming a fourth knot K4 downstream of the rotors R3 and upstream of the third knot K3 in each of the spaces in which the rotors R3 are disposed, and (F) feeding the line elements by a predetermined length, rotating the rotors R3 and the rotors R1 respectively by 60° in opposite directions to each other and thereafter moving the line elements from the recesses of the rotors R3 to the recesses of the rotors R1.

In another aspect of the invention, there is provided a method for manufacturing a three-dimensional net-like structure including a mist eliminator and a multi-layer filtering film made of a plurality of unit structures which are arranged continuously in vertical and horizontal directions of the three-dimensional net-like structure, each of the unit structures being formed by conversion and dispersion of four line elements, said method comprising a step of forming a converging section of the unit structure where the four line elements converge by twisting the four line elements together.

In another aspect of the invention, there is provided a method for manufacturing a three-dimensional net-like structure including a mist eliminator and a multi-layer filtering film made of a plurality of unit structures which are arranged continuously in vertical and horizontal directions of the three-dimensional net-like structure, each of the unit structures being formed by conversion and dispersion of four line elements, said method comprising steps of:

(A) preparing a three-dimensional net-like structure manufacturing space by forming a predetermined number of hypothetical channels of a regular square cross-section so that these hypothetical channels align in columns and rows without leaving spaces between them, said hypothetical channels consisting of first hypothetical channels CA and second hypothetical channels CB which are disposed alternately in columns and rows of the hypothetical channels, and disposing, in the three-dimensional net-like structure manufacturing space, a plurality of rotors each having a circular shape in the radial section, being formed with four recesses in the periphery thereof at an interval of 90° for respectively receiving a line element and being connected to a rotor control unit and rotatable by a predetermined angle by operating the rotor control unit, said rotors consisting of rotors RA each being disposed in one of the first hypothetical channels CA and rotors RB each being disposed in one of the second hypothetical channels CB in such a manner that the line element can be moved between the recess of the rotor RA and the recess of the rotor RB, (B) inserting the line elements unwound from bobbins in the respective recesses of the rotors RA and thereafter rotating the rotors RA by one revolution or over to twist the four line elements inserted in the respective recesses of each of the rotors RA and thereby forming a first knot KCA in each of the hypothetical channels CA downstream of the rotors RA in a feeding direction of the line elements, (C) feeding the line elements by a predetermined length, moving the line elements from the recesses of the rotors RA to the recesses of the rotors RB and thereafter rotating the rotors RB by one revolution or over to twist the four line elements inserted in the recesses of the rotors RB and thereby forming a second knot KCB upstream of the first knot KCA in each of the hypothetical channels CB, and (D) feeding the line elements by a predetermined length and moving the line elements from the recesses of the rotors RB to the recesses of the rotors RA.

In another aspect of the invention, there is provided a packing made of a three-dimensional net-like structure which constitutes an internal structure of a device which performs material transfer, heat exchange or mixing between gases, liquids or gas and liquid, said internal structure being divided in a plurality of chambers or channels connected to one another and said three-dimensional net-like structure being made of a plurality of unit structures which are arranged continuously in vertical and horizontal directions of the three-dimensional net-like structure, each of the unit structures being formed by conversion and dispersion of three line elements characterized in that a converging section of the unit structure where the three line elements converge is formed by twisting the three line elements together.

In another aspect of the invention, there is proivded a packing made of a three-dimensional net-like structure which constitutes an internal structure of a device which performs material transfer, heat exchange or mixing between gases, liquids or gas and liquid, said internal structure being divided in a plurality of chambers or channels connected to one another and said three-dimensional net-like structure being made of a plurality of unit structures which are arranged continuously in vertical and horizontal directions of the three-dimensional net-like structure, each of the unit structures being formed by conversion and dispersion of four line elements characterized in that a converging section of the unit structure where the four line elements converge is formed by twisting the four line elements together.

In another aspect of the invention, there is provided a three-dimensional net-like structure including a mist eliminator and a multi-layer filtering film made of a plurality of unit structures which are arranged continuously in vertical and horizontal directions of the three-dimensional net-like structure, each of the unit structures being formed by conversion and dispersion of three line elements characterized in that a converging section of the unit structure where the three line elements converge is formed by twisting the three line elements together.

In still another aspect of the invention, there is provided a three-dimensional net-like structure including a mist eliminator and a multi-layer filtering film made of a plurality of unit structures which are arranged continuously in vertical and horizontal directions of the three-dimensional net-like structure, each of the unit structures being formed by conversion and dispersion of four line elements characterized in that a converging section of the unit structure where the four line elements converge is formed by twisting the four line elements together.

Preferred embodiment of the invention will be described below with reference to the accompanying drawings.

BRIEF DESCRIPTION OF THE DRAWINGS

In the accompanying drawings.

DESCRIPTION OF PREFERRED EMBODIMENTS

Embodiment 1

Figure 1:
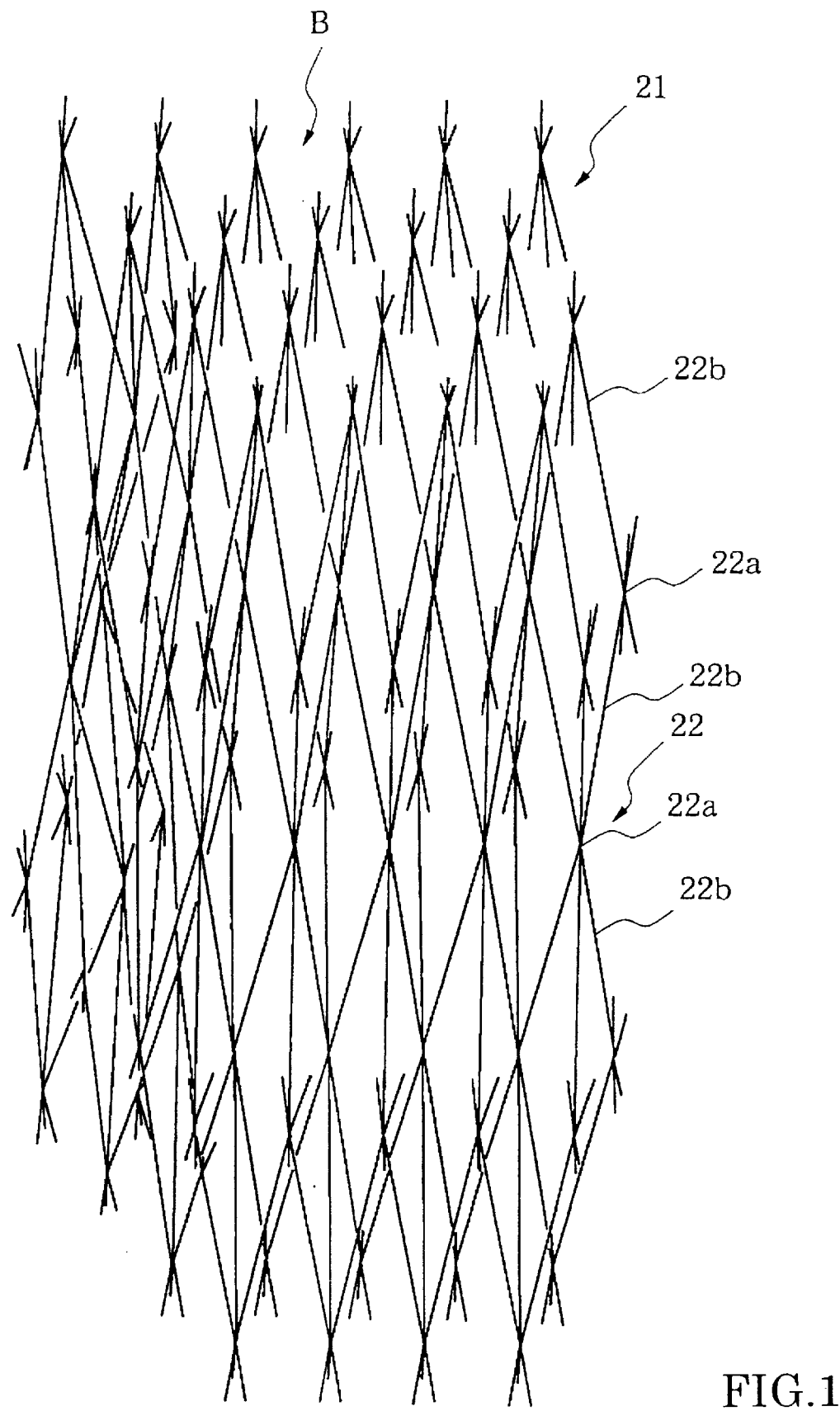
FIG. 1 is schematic perspective view showing an example of a three-dimensional net-like structure.
Figure 2:
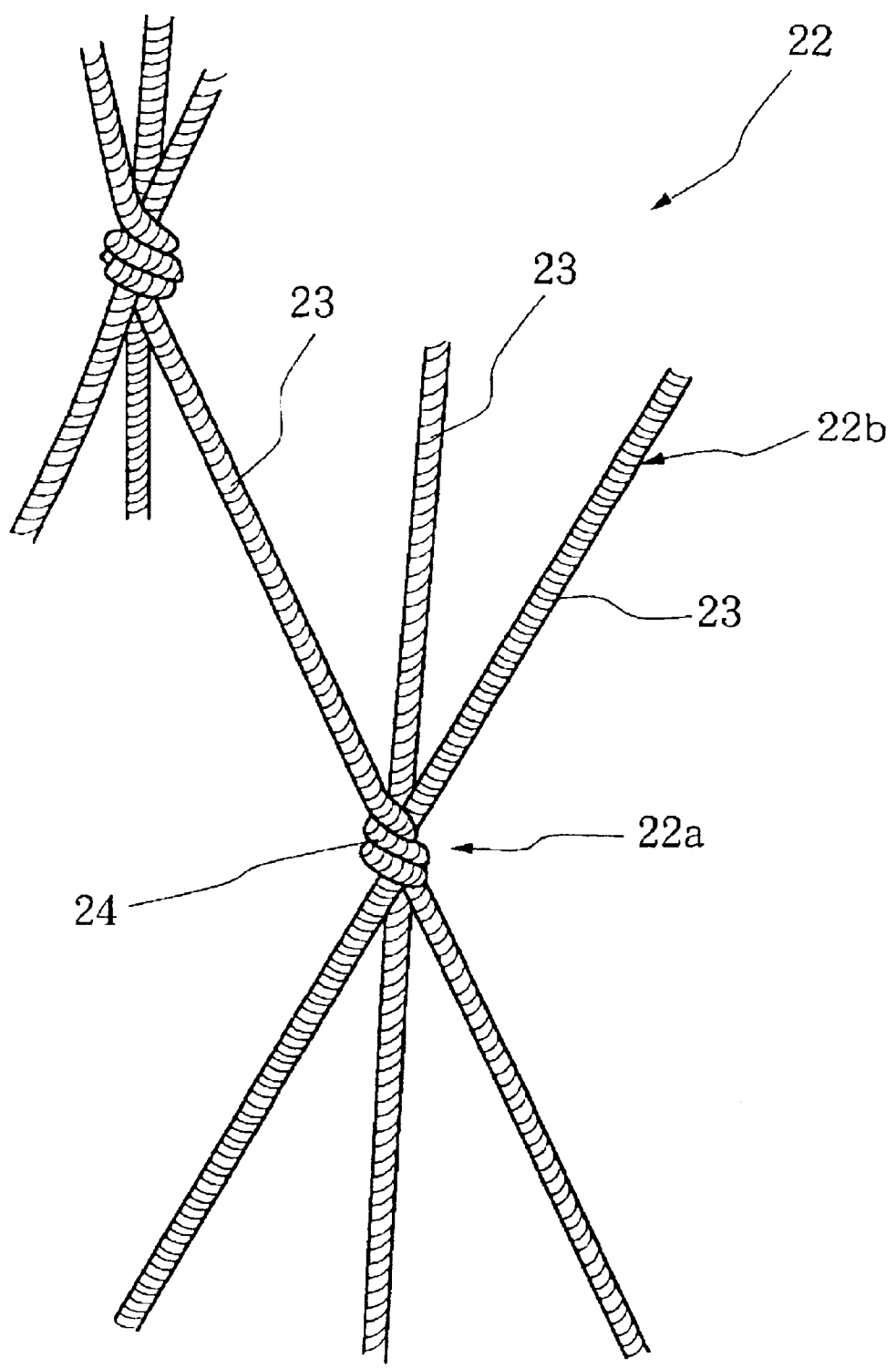
FIG. 2 is a perspective view showing a unit structure used in this example.

This embodiment relates to a method for manufacturing a three-dimensional net-like structure shown in FIGS. 1 and 2 in which the unit structure is formed by conversion and dispersion of three line elements.

(1) Step of Preparing a Three-dimensional Net-like Structure Manufacturing Space In this embodiment, three line elements 23 are transferred among first rotors and second rotors disposed respectively in two types of hypothetical channels in the form of a pipe of a regular triangular cross section and third rotors which are disposed in spaces defined between the first and second rotors, and thereafter the transferred line elements are twisted by rotating the rotors to cause conversion and dispersion of these line elements whereby the three-dimensional net-like structure as shown in FIGS. 1 and 2 is manufactured.

Figure 5:
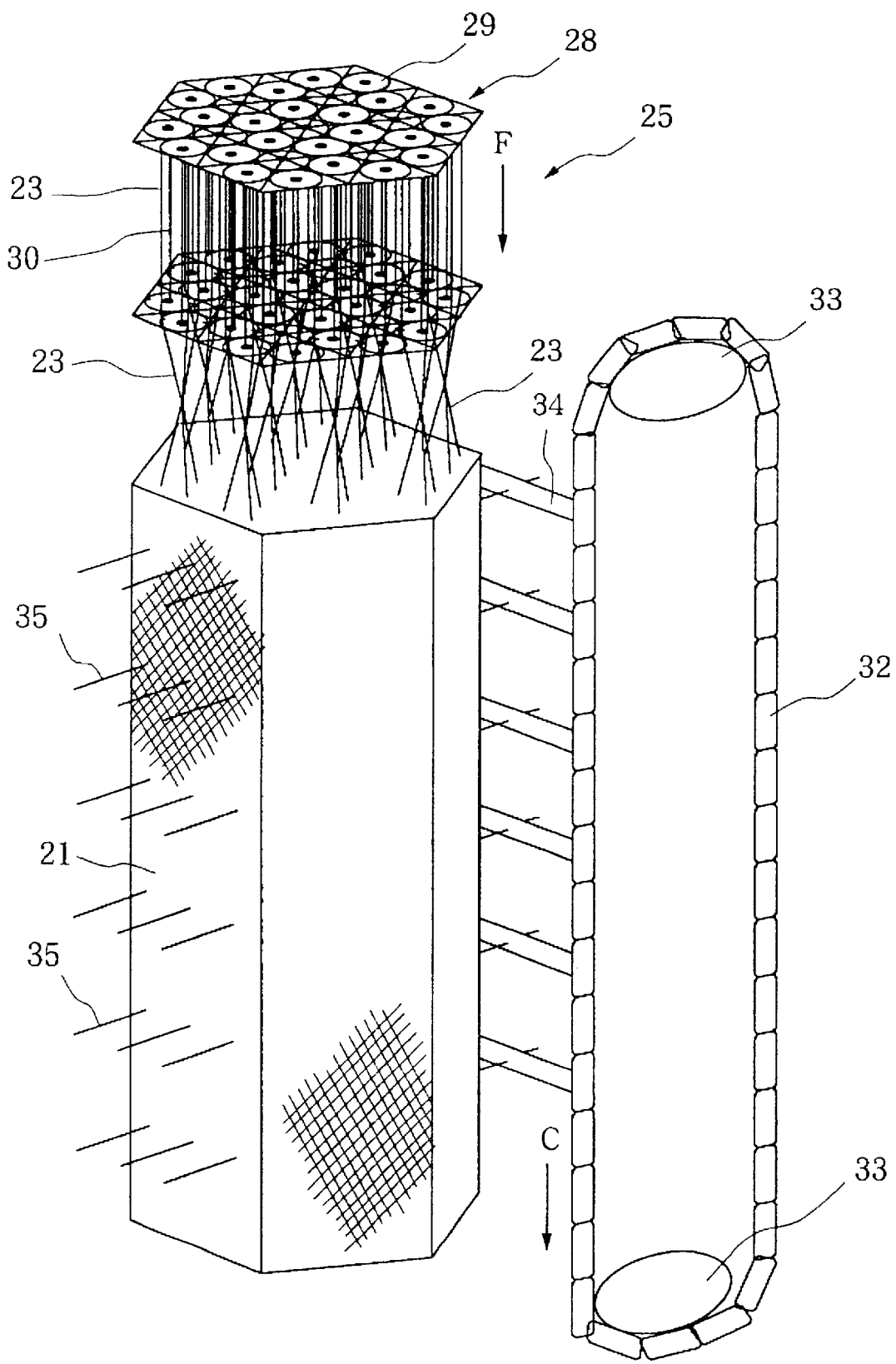
FIG. 5 is a perspective view schematically showing a principal portion of a device for manufacturing the three-dimensional net-like structure.
Figure 6:
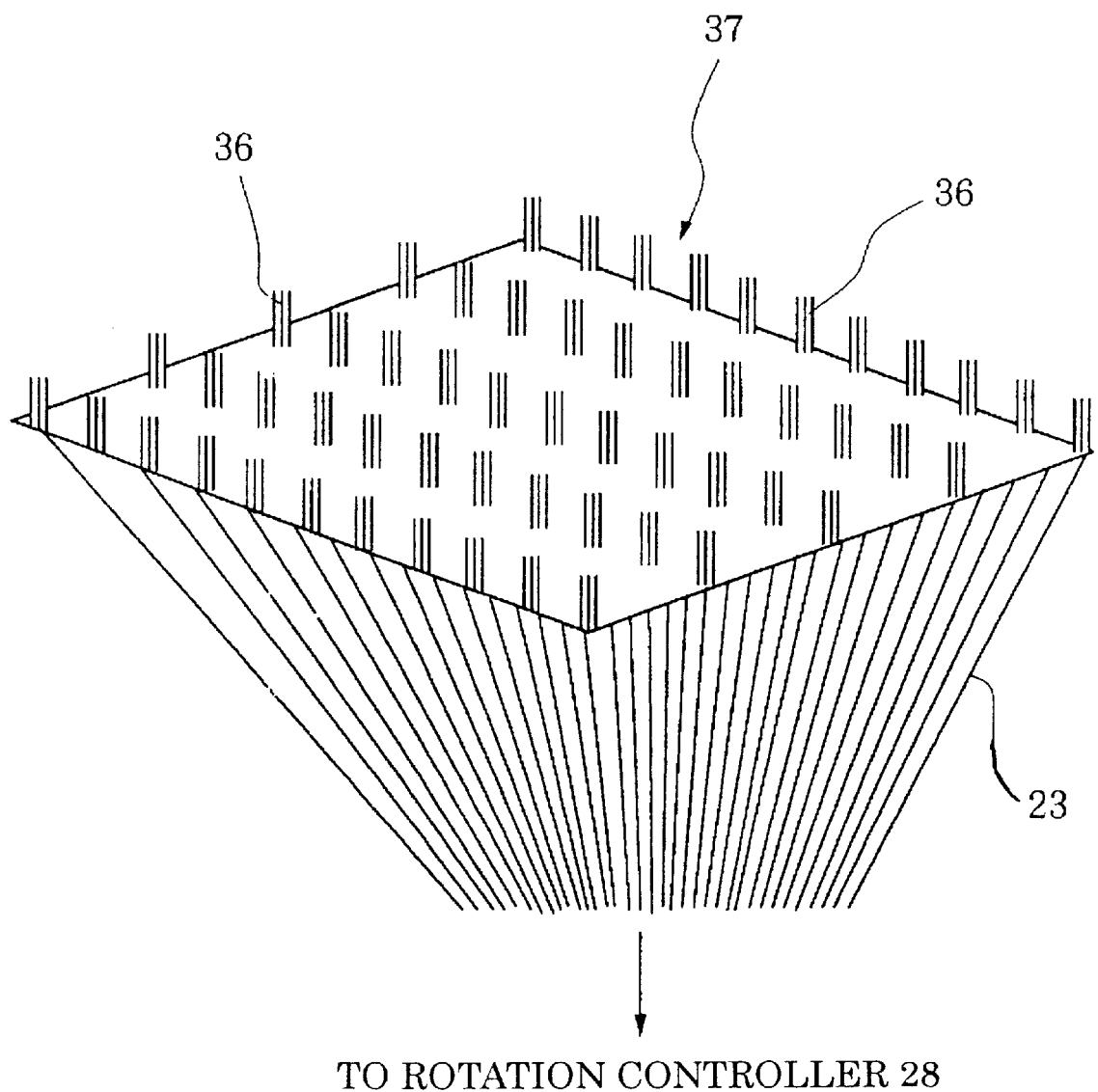
FIG. 6 is a perspective view schematically showing a bobbin section of the device.

For this purpose, in the present embodiment, a three-dimensional net-like structure manufacturing device 25 shown schematically in the perspective views of FIGS. 5 and 6 is used to perform transfer of the line elements 23 among the three types of rotors and rotation of the rotors and thereby cause conversion and dispersion of the line elements 23.

Figure 7:
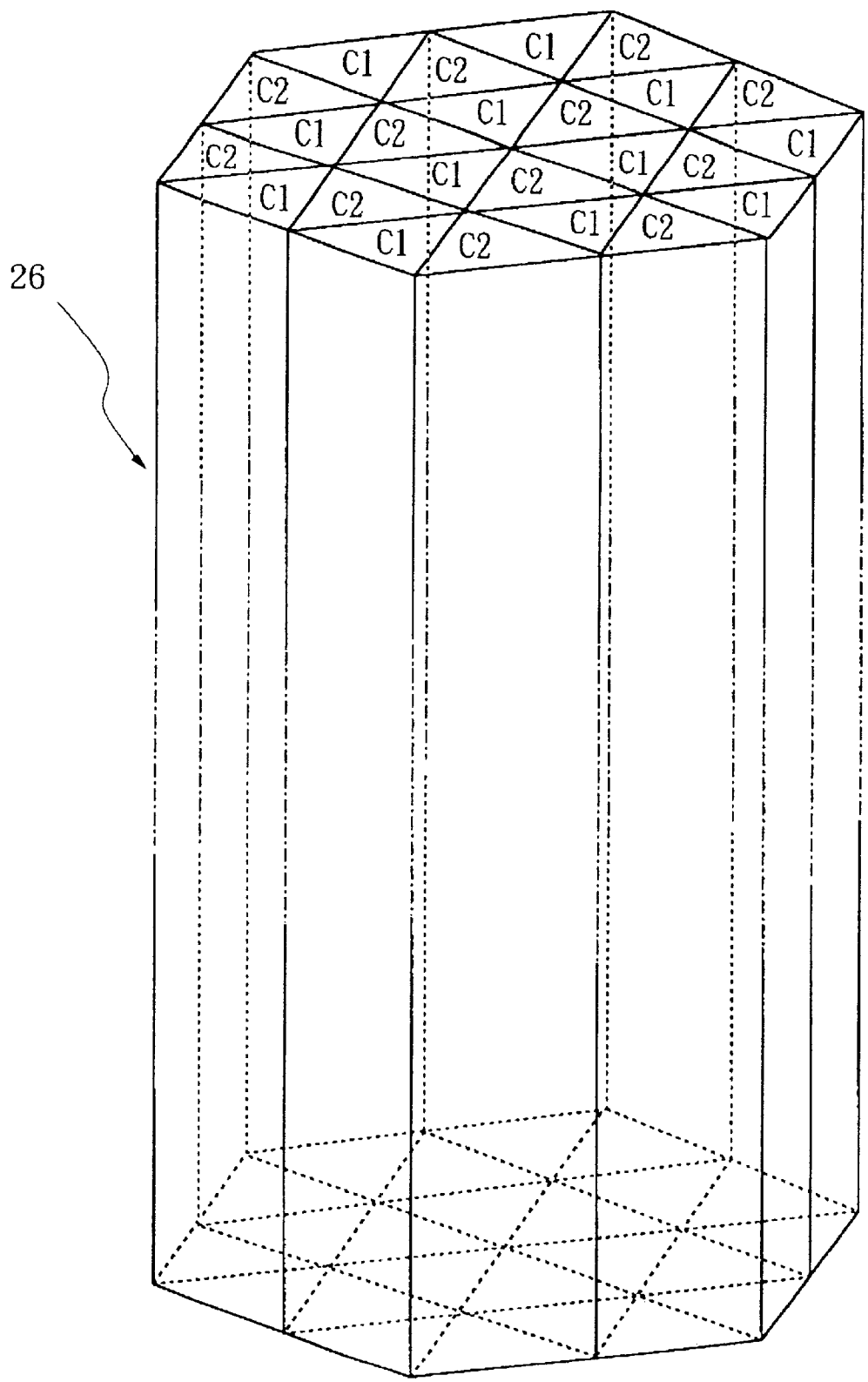
FIG. 7 is a prespective view showing a three-dimensional net-like structure manufacturing space.

In FIG. 5, a hexagonal pillar schematically represents a three-dimensional net-like structure 21 which has been manufactured in a three-dimensional net-like structure manufacturing space 26 in the form of a hexagonal pillar consisting of a plurality of hypothetical channels shown in FIG. 7.

The three-dimensional net-like structure manufacturing space 26 shown in FIG. 7 is formed by disposing a predetermined number (24 in the illustrated example) of hypothetical channels in the form of a pipe of a regular triangular cross section without leaving a space between them in such a manner that six of these hypothetical channels which have a common apex (i.e., one of their apexes contact one another) in their cross section will form a regular hexagonal cross section. The hypothetical channels consist of a plurality (12 in the illustrated example) of hypothetical channels C1 which share one apex of a triangle (i.e., their apexes contact one another) but do not share a side of a triangle (i.e., their sides do not contact each other in a parallel state) in their cross section with adjacent hypothetical channels, and a plurality (12 in the illustrated example) of hypothetical channels C2 which share a side of a triangle (i.e., their sides contact each other in a parallel state) in their cross section with the hypothetical channels C1.

Alternatively stated, the hypothetical channels C1 share one edge but do not share a lateral face with adjacent hypothetical channels C1 and th hypothetical channels C2 are disposed between the hypothetical channels C1 and share a lateral face with adjacent hypothetical channels C1. Alternatively stated further, these hypothetical channels C1 and C2 are disposed side by side about the center of the hexagonal pillar formed by these hypothetical channels C1 and C2.

Figure 8:
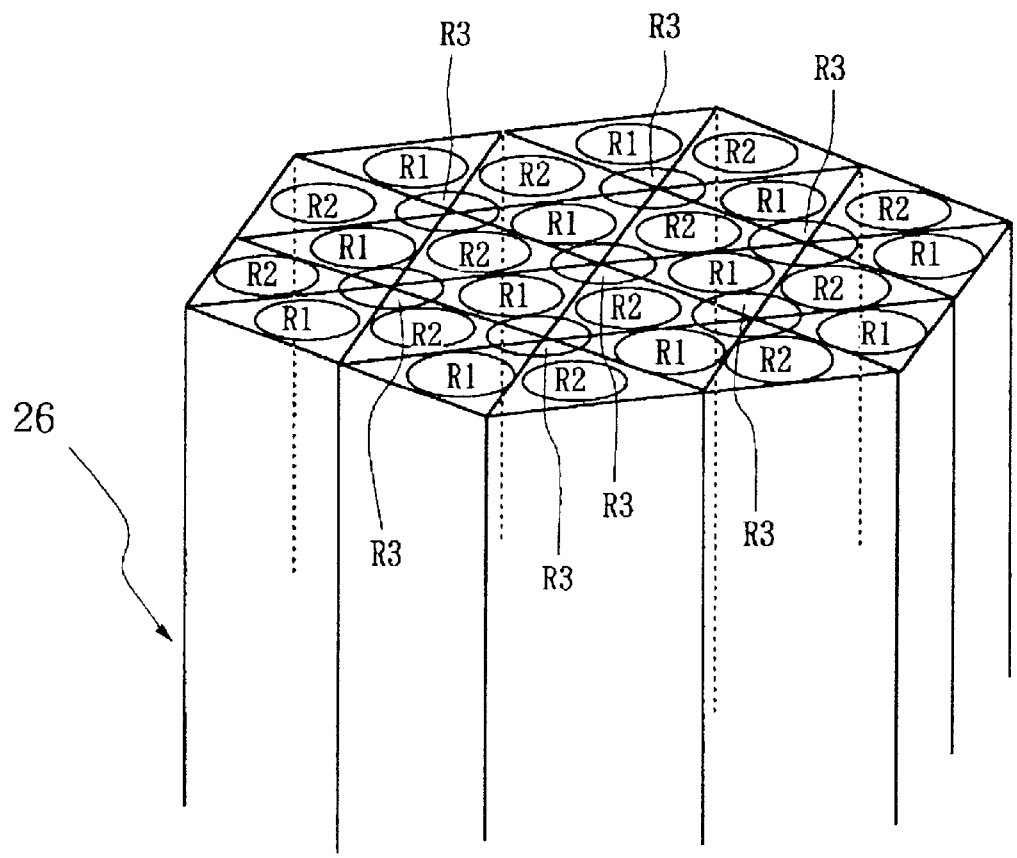
FIG. 8 is a perspective view showing rotors disposed in the three-dimensional net-like structure manufacturing space.
Figure 9:
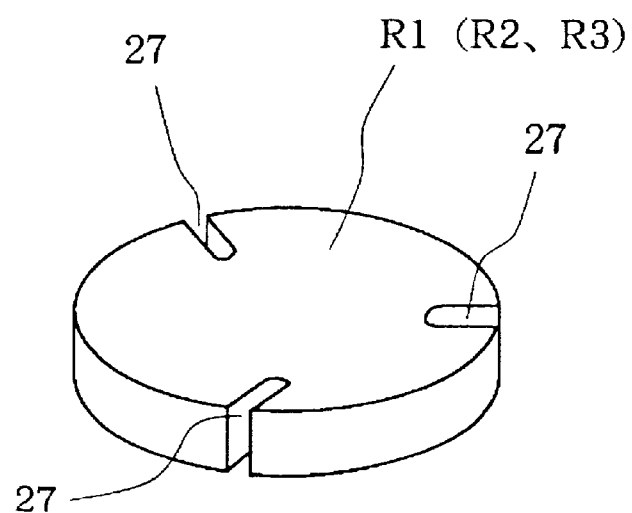
FIG. 9 is a perspective view showing a shape of the rotor.

In this three-dimensional net-like structure manufacturing space 26 are disposed, as shown in FIG. 8, three types of rotors R1, R2 and R3 which constitute a part of the manufacturing device 25. In the present embodiment, the rotors R1, R2 and R3 are formed in the form of a disk as shown in FIG. 9 and are formed in their periphery with U-shaped recesses 27 at an interval of 120° for receiving three line elements 23.

In the hypothetical channels C1 of the manufacturing space 26 are disposed the rotors R1, in the hypothetical channels C2 are disposed the rotors R2 and in spaces defined by the three rotors R1 disposed in the hypothetical channels C1 which share one apex of a triangle in cross section and the three rotors R2 disposed in the hypothetical channels C2 are disposed the rotors R3.

These rotors R1, R2 and R3 are of an equal diameter and these rotors R1, R2 and R3 are disposed in such a manner that the line elements 23 can be moved (transferred) between the recesses 27 of the rotors R3 and the recesses 27 of the rotors R1 and also between the recesses 27 of the rotors R3 and the recesses 27 of the rotors R2 and that the rotors R1 do not contact the rotors R2. The mutual contact between the rotors R1 and the rotors R2 is prohibited because it is unnecessary to have them contact each other since the line elements 23 are not moved (transferred) between the rotors R1 and the rotors R2 and, besides, since the rotors R1 and the rotors R2 are rotated in the same direction, contact between these two types of rotors will cause rotation of the entire rotors R1, R2 and R3 to stop.

Figure 10:
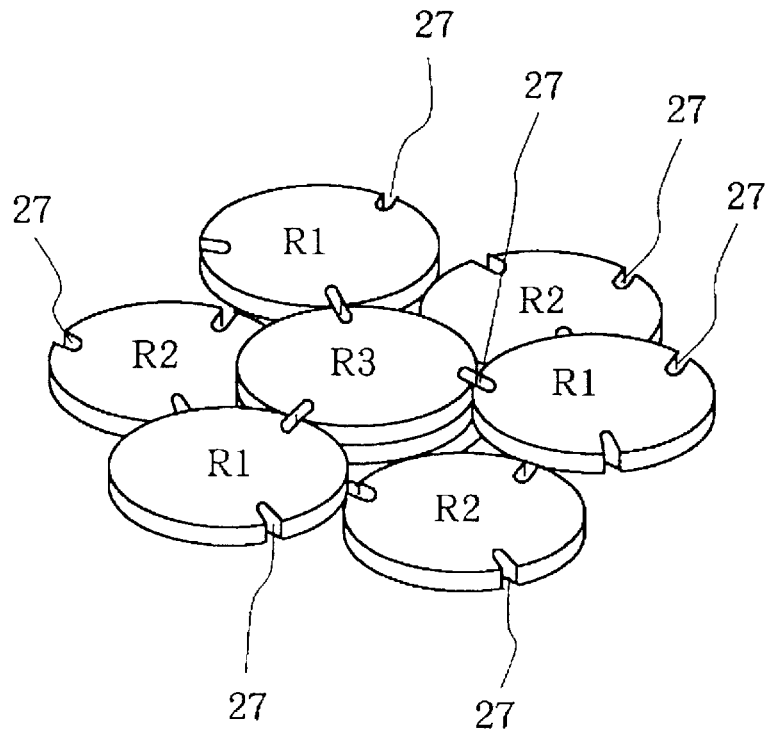
FIG. 10 is a perspective view showing a manner of disposing rotors R1, R2 and R3.

For satisfying these conditions, a small gap which is smaller than the diameter of the line element 23 may be provided between each rotor R3 and each rotor R1 and between each rotor R3 and each rotor R2 for preventing falling of the line element and a gap of the same size may be provided between each rotor R1 and each rotor R2. Alternatively, as shown in FIG. 10, mutual contact between the rotors R1 and the rotors R2 can be prevented by adopting a structure according to which the rotors R3 and the rotors R1 are rotated in mutual contact and the rotors R3 and the rotors R2 are rotated in mutual contact but height of the plane of contact between the rotors R3 and the rotors R1 is made different from height of the plane of contact between the rotors R3 and the rotors R2. In the illustrated embodiment, the former arrangement is adopted and a small gap which is smaller than the diameter of the line element 23 is provided between the rotors R1, R2 and R3.

For enabling movement of the line elements 23 between the rotors R3 and the rotors R1 and between the rotors R3 and the rotors R2, the rotors R3 and the rotors R1, and the rotors R3 and the rotors R2 are disposed at relative positions where their recesses 27 are in alignment at a position where the rotors R3 and the rotors R1, and the rotors R3 and the rotors R2 are in mutual contact or in the closest proximity witch each other. Further, the rotors R1, R2 and R3 are disposed in such a manner that, at the position where the recesses 27 of the rotors R3 and the rotors R1 are in alignment with each other, the two recesses 27 of the rotor R2 are distant by 60° from the position where the rotor R2 and the rotors R3 are in mutual contact or in the closest proximity with each other and that, at the position where the recesses 27 of the rotors R3 and the rotors R2 are in alignment with each other, the two recesses 27 of the rotor R1 are distant by 60° from the position where the rotor R1 and the rotors R3 are in mutual contact or in the closest proximity with each other. Accordingly, by rotating the rotor R3 and the rotor R2 by 60° from the position where the recess 27 of the rotor R3 is in alignment with that of the rotor R1, the recesses 27 of the rotors R3 and R2 are brought into alignment.

Figure 11:
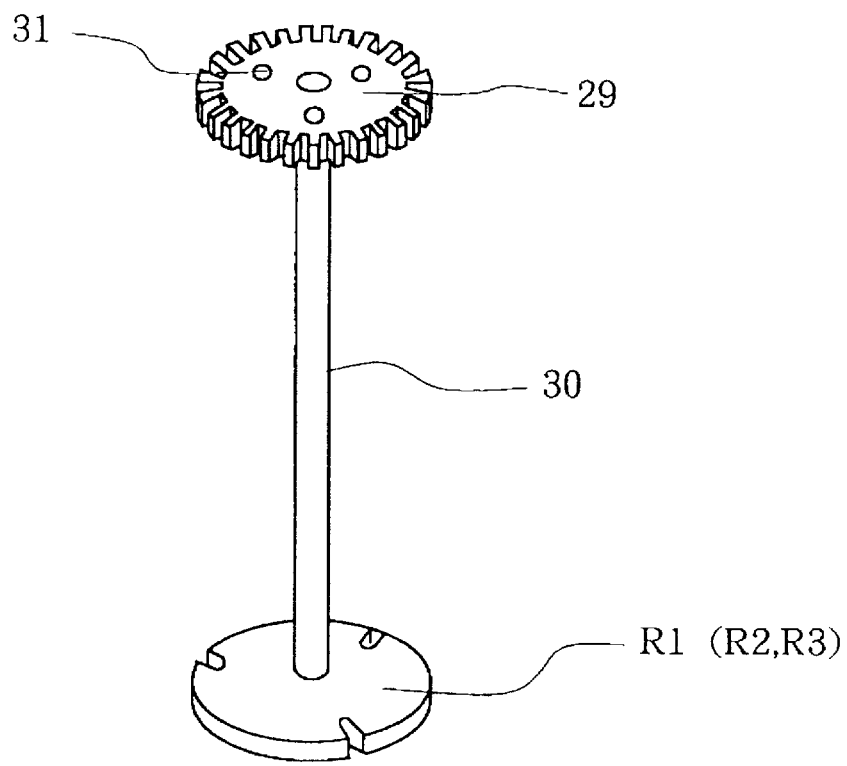
FIG. 11 is a perspective view showing connection between the rotors and the rotor control section.

As shown in FIGS. 5 and 11, the rotors R1, R2 and R3 are fixedly connected to gears 29 of a rotation controller 28 which constitutes the rotor control unit of the invention and is provided upstream of these rotors in the feeding direction of the line elements 23 (i.e., the direction of arrow F in FIG. 5) by means of connection shafts 30 which are coaxial with the rotors R1, R2 and R3 and also with the gears 29. The gears 29 of the rotation controller 28 are made of spur gears having the same or substantially the same diameter as the rotors R1, R2 and R3 and the gears 29 have the same diameter and same number of teeth. The gear 29 corresponding to the rotor R1 or R2 is formed in its peripheral portion with line element insertion openings 31 for inserting three line elements 23 at an interval of 120°. The gear 29 having the line element insertion openings 31 has only a function of guiding three line elements 23 unwound from bobbins to be described later and has no function of transferring the line element 23 between the adjacent gear 29.

In the gears 29 of the rotation controller 28, the contact rotation mechanism of the rotors R1, R2 and R3 shown in FIG. 10 is adopted so that the gear 29 corresponding to the rotor R3 meshes with the gear 29 corresponding to the rotor R1 and the gear corresponding to the rotor R3 meshes with the gear 29 corresponding to the rotor R2 but height of the plane on which the gear 29 corresponding to the rotor R3 meshes with the gear 29 corresponding to the rotor R1 is made different from height of the plane on which the gears 29 corresponding to the rotors R3 meshes with the gear 29 corresponding to the rotor R2 whereby mutual contact between the gear 29 corresponding to the rotor R1 and the gear 29 corresponding to the rotor R2 is prevented. The gears 29 which do not have the line element insertion openings 31 among the group of gears 29 of the rotation controller 28 have only a function of transmitting rotation in the gear train described above. Accordingly, by transmitting rotation of the motor to one of the gears in the group of gears 29, the rotation is transmitted to the entire gears 29 of the gear group.

The gears 29 of the rotation controller 28 are disposed at positions corresponding to the rotors R1, R2 and R3 in a space upstream of the three-dimensional net-like structure manufacturing space 26. The rotation controller 28 has a sequence control unit which transmits rotation of the motor to the gears 29 by a desired rotation angle in accordance with the set sequence operation. Accordingly, by rotating the gears 29 by a desired angle, the rotors R1, R2 and R3 can be rotated by the same angle.

As shown in FIG. 5, the manufacturing device 25 includes a pair of conveyers 32 provided at both sides of the three-dimensional net-like structure 21 produced (only a right side conveyer is shown in FIG. 5). Each of the pair of conveyers 32 moves in the direction of arrow C by means of a pair of pulleys 33 disposed vertically in FIG. 5. A plurality of plates 34 are provided at a predetermined interval between the pair of conveyers 32 and these plates 34 are fixed at both ends thereof to the pair of conveyers 32. Spacers 35 functioning also as a hanger in the form of a rod are detachably mounted on the plates 34. By disposing these spacer/hangers 35 so that they penetrate the three-dimensional net-like structure 21 produced in the manufacturing space 26, the produced three-dimensional net-like structure 21 is pushed by the spacer/hangers 35 in the direction of the arrow C while retaining the predetermined configuration whereby the three-dimensional net-like structure 21 is continuously manufactured. An arrangement is made so that the spacer/hangers 35 are automatically mounted to the plates 34 at the upper end portion of the conveyers 32 and are automatically detached from the plates 34 at the lower end portion of the conveyers 32.

A bobbin section 37 having bobbins 36 is provided upstream of the rotation controller 28 in the feeding direction of the line elements 23. The line elements 23 stored in the respective bobbins 36 are wound from the bobbins 36 and passed through the line element insertion openings 31 of the gears 29 among the gear group of the rotation controller 28 and fed to the recesses 27 of the corresponding rotors among the rotors R1, R2 and R3.

(2) Step of Forming a First Knot K1

The three-dimensional net-like structure 21 is manufactured in the manufacturing space 26 in the following manner. First, the line elements 23 unwound from the bobbins 36 are passed through the line element insertion openings 31 of the gears 29 of the rotation controller 28 and the recesses 27 of the rotors R1 and then the foremost ends of the line elements 23 are fixed to line element fixing positions 39 corresponding to the recesses 27 of the rotors R1 in a line element fixing plate 38 (FIG. 13) provided at a position in the manufacturing space 26 which is downstream of the rotors in the feeding direction.

Figure 12:
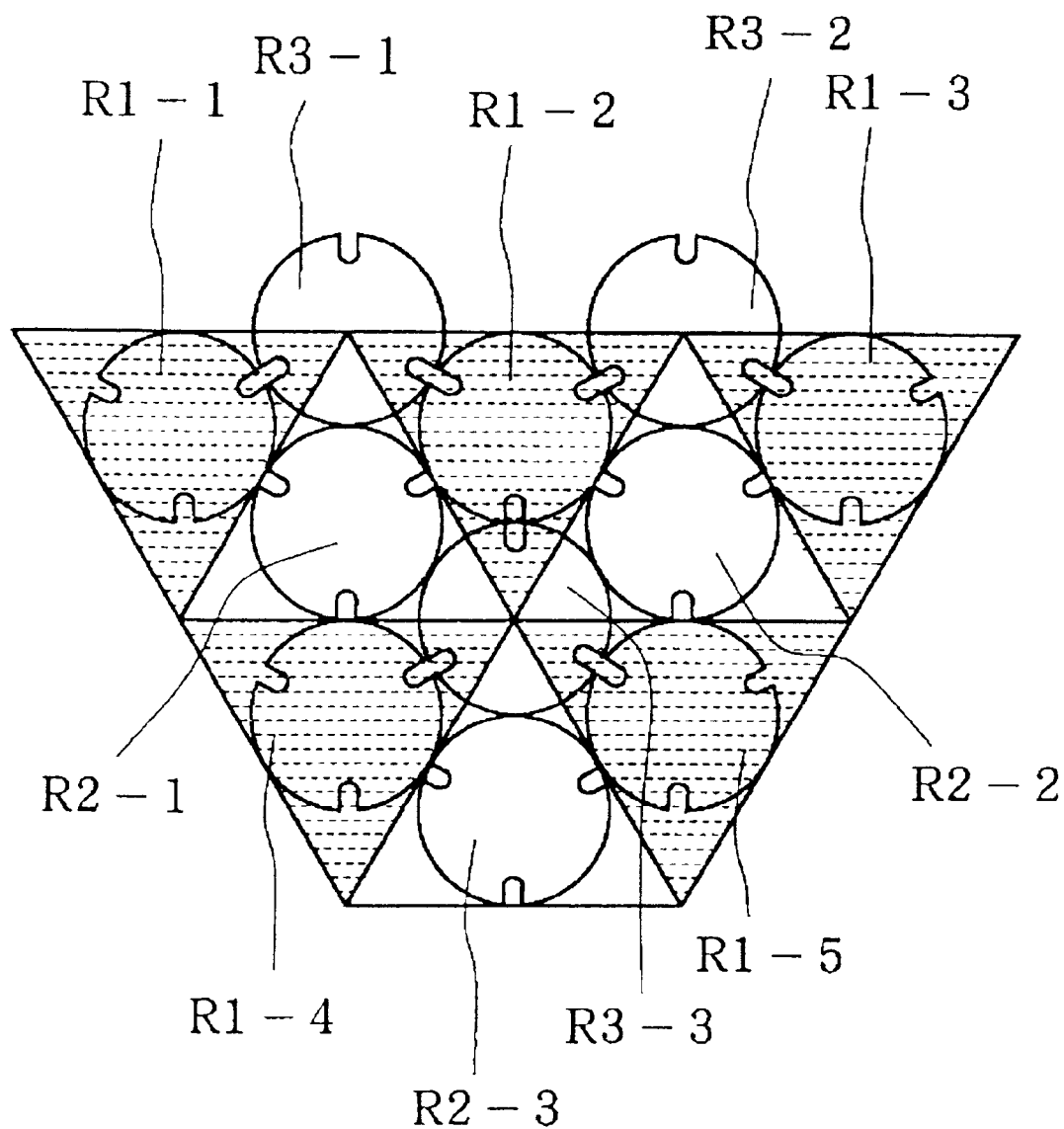
FIG. 12 is a plan view showing a part of a three-dimensional net-like structure manufacturing space

In the following description, for convenience of explanation, five rotors R1, three rotors R2 and three rotors R3 shown in FIG. 12 among twelve rotors R1, twelve rotors R2 and seven rotors R3 shown in FIG. 8 are designated by reference characters R1-1 to R1-5, R2-1 to R2-3 and R3-1 to R3-3 and operation of the line elements 23 by these rotors R1-1 to R1-5, R2-1 to R2-3 and R3-1 to R3-3 will be described. Operation of the line elements 23 by the other rotors shown in FIG. 8 is entirely the same as the operation by the rotors shown in FIG. 12.

The line elements 23 used in the manufacturing method of the invention may be made of metal or plastic. There is no particular limitation in the material used for line element and wire, twine or monofilament may be used as the line elements. Since the line element is formed to a three-dimensional net-like structure by twisting, the material for the line element must be capable of plastic deformation and have sufficient rigidity to maintain their shape after twisting.

The line element may be made of a monofilament or a single piece of wire but a line element made of wire or twine which is made by twisting thin steel lines or plastic lines is preferable because liquid flows along the space between the lines which constitute the wire or twine due to the capillary action and thereby enhance transfer of the liquid. In the present embodiment, seven steel lines each having a diameter of 0.1 mm are twisted together to form a single steel wire and two of this steel wire are further twisted to a single wire and this wire is used as the line element 23.

For convenience of explanation, fifteen line elements 23 inserted in the recesses 27 of the rotors R1-1 to R1-5 are distinguished from one another by reference characters No. 1 to No. 15. In the step shown in FIG. 13, the line elements No. 1 to No. 3 are received in the rotor R1-1, the line elements No. 4 to No. 6 are received in the rotor R1-2, the line elements No. 7 to No. 9 are received in the rotor R1-3, the line elements No. 10 to No. 12 are received in the rotor R1-4 and the line elements No. 13 to No. 15 are received in the rotor R1-5.

Figure 13:
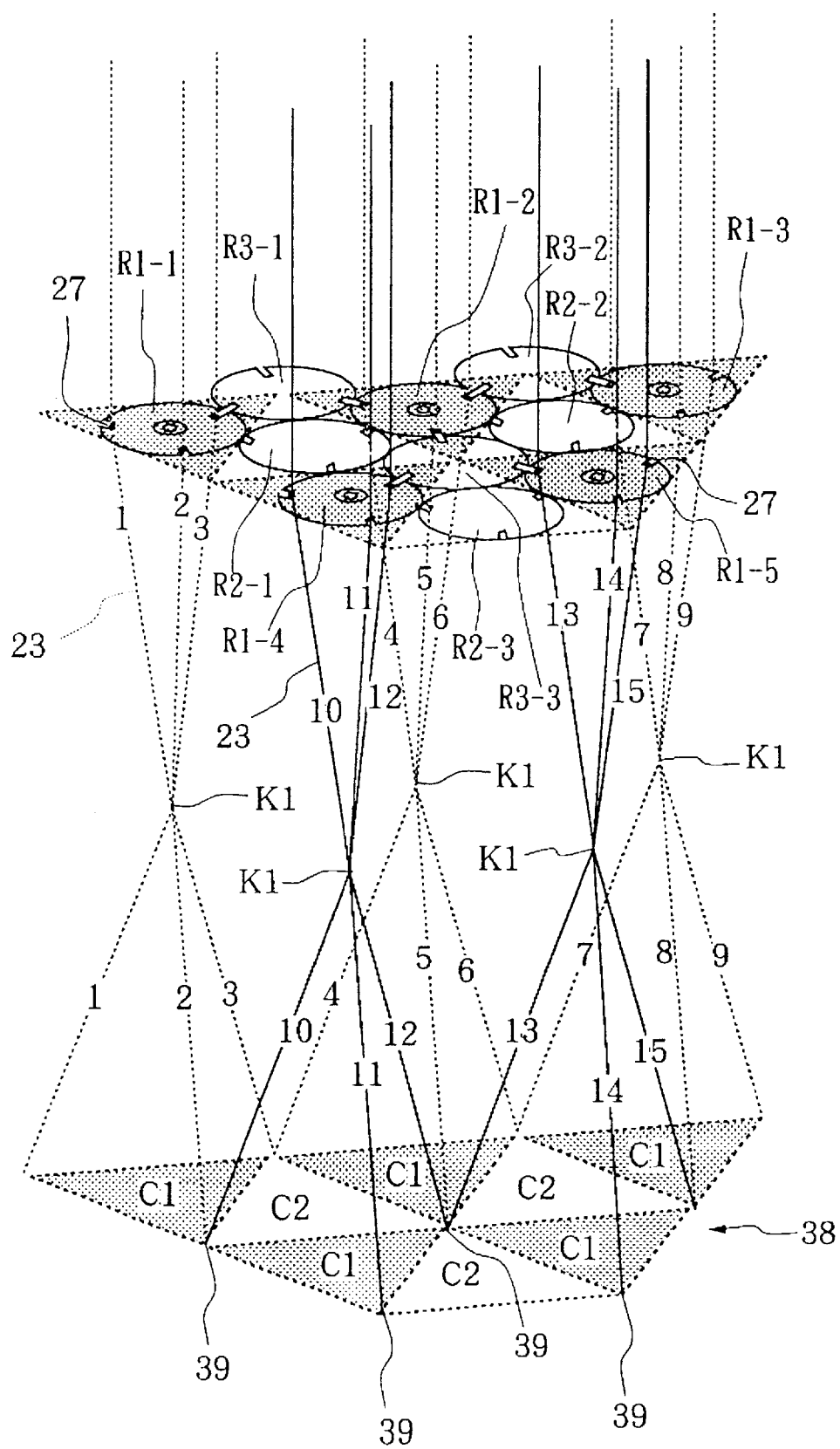
FIG. 13 is a perspective view showing a process of forming a first knot K1 in the method of manufacturing the three-dimensional net-like structure.

In the state shown in FIG. 13, the recess 27 of the rotor R1-1 is in alignment with the recess 27 of the rotor R3-1, the recesses 27 of the rotor R1-2 are in alignment with the recesses 27 of the rotors R3-1 to R3-3 and the recess 27 of the rotor R1-5 is in alignment with the recess 27 of the rotor R3-3.

By rotating the gears 29 in the rotation controller 28 corresponding the rotors R1-1 to R1-5 in the above described state by one revolution or over (preferably by two revolutions, i.e., 720°), the rotors R1-1 to R1-5 are rotated by the same rotation angle. The three line elements inserted in the recesses 27 of each of the rotors R1-1 to R1-5 are twisted in a middle position between the rotors R1-1 to R1-5 and the line element fixing plate 38 and, as a result, a knot K1 which is of the same shape as the knot 24 shown in FIG. 2 which is formed by twisting is formed. Thus, first knots K1 are formed downstream of the rotors in the feeding direction of the line elements 23 in the respective hypothetical channels C1.

(3) Step of Forming a Second Knot K2

Figure 14:
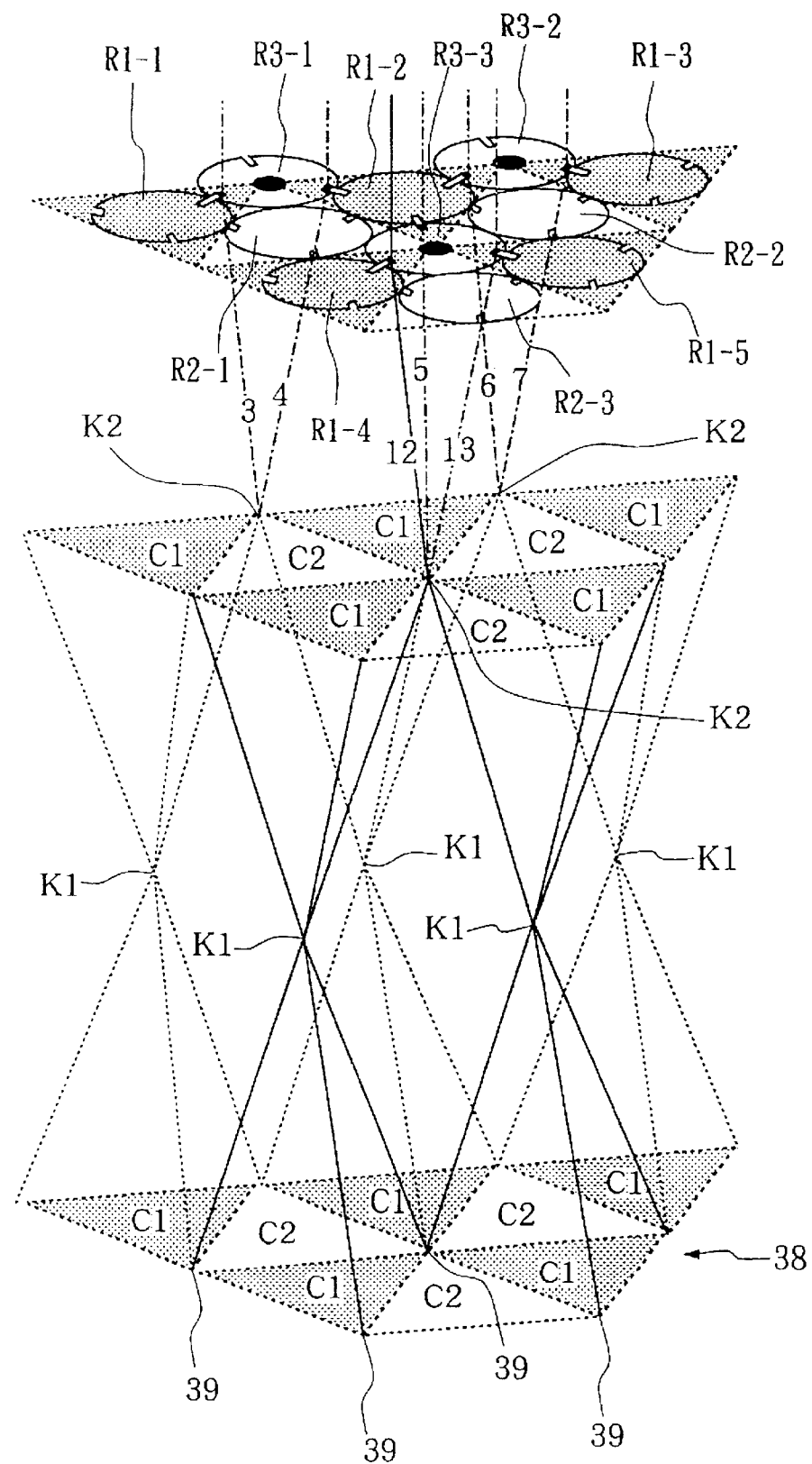
FIG. 14 is a perspective view showing a process of forming a second knot K2 in the same method.

The line elements 23 are fed in the feeding direction by a predetermined length (in the present embodiment, length between the first knots K1 and the recesses 27 of the rotors R1-1 to R1-5) and then the line elements 23 are moved, as shown in FIG. 14, from the recesses 27 of the rotors R1-1 to R1-5 to the recesses 27 of the adjacent rotors R3-1 to R3-3 which are in alignment. More specifically, the line element No. 3 is moved from the recess 27 of the rotor R1-1 to the recess 27 of the rotor R3-1, the line element No. 4 is moved from the recess 27 of the rotor R1-2 to the recess 27 of the rotor R3-1, the line element No. 5 is moved from the recess 27 of the rotor R1-2 to the recess 27 of the rotor R3-3, the line element No. 6 is moved from the recess 27 of the rotor R1-2 to the recess 27 of the rotor R3-2, the line element No. 7 is moved from the recess 27 of the rotor R1-3 to the recess 27 of the rotor R3-2, the line element No. 12 is moved from the recess 27 of the rotor R1-4 to the recess 27 of the rotor R3-3, the line element No. 13 is moved from the recess 27 of the rotor R1-5 to the recess 27 of the rotor R3-3.

Figure 15:
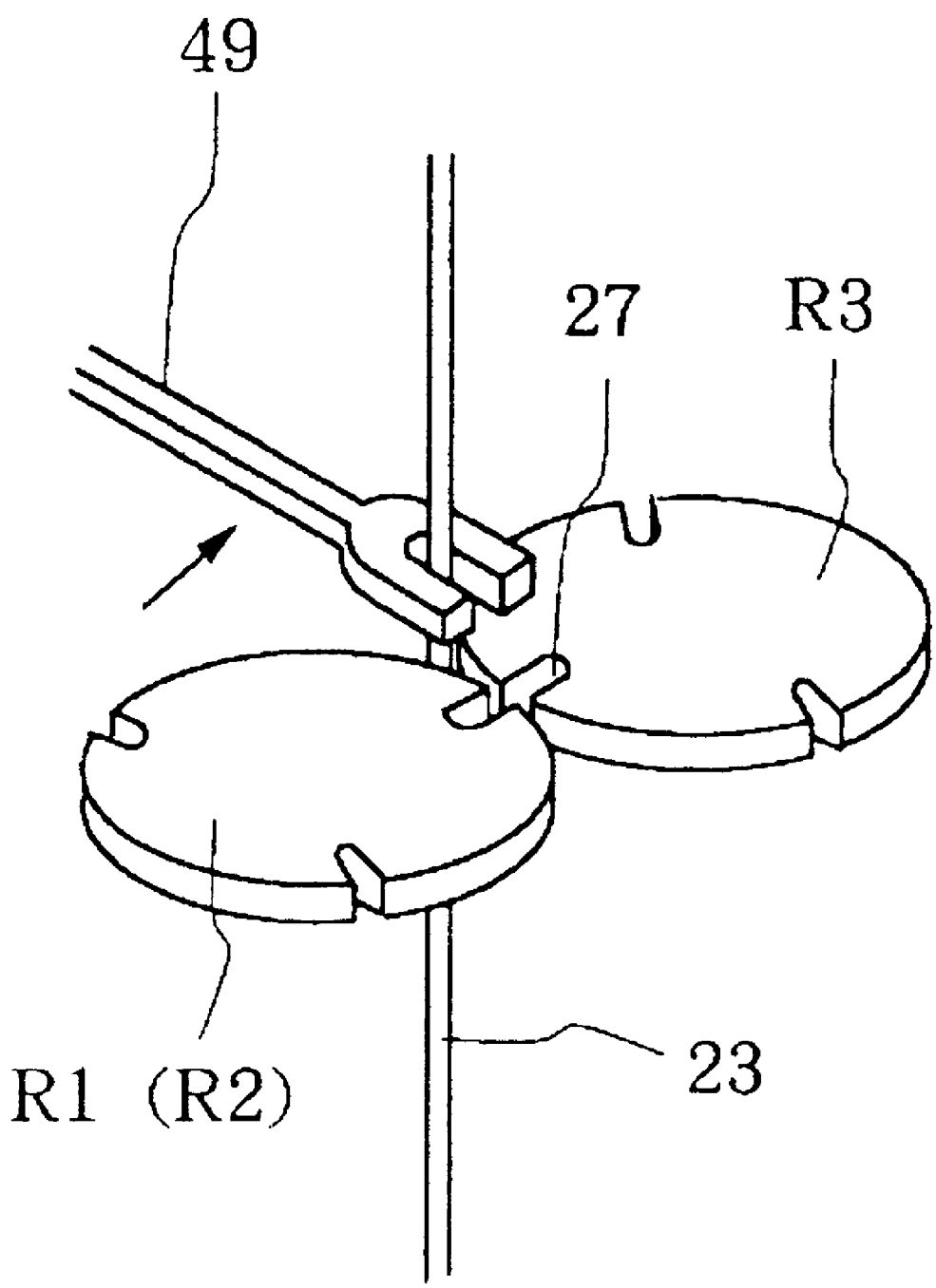
FIG. 15 is a perspective view showing an example of a means for moving a line element from a recess of one rotor to a recess of another rotor.

For moving the line elements 23 between the rotors R3 and R1 and between the rotors R3 and R2, for example, as shown in FIG. 15, an arm 49 which is provided above (or below) a position in which the rotor R3 and the rotor R1 (or rotor R2) are in the closest proximity to each other is operated by a sequence control to push the line element 23 from the recess 27 of one rotor to the recess 27 of the other rotor. Alternatively, a solenoid may be provided in the inside of the respective recesses 27 and its plunger may be actuated to push the line element 23 from the recess 27 of one rotor to the recess 27 of the other rotor. Various other means may also be employed for moving the line element 23 from the recess 27 of one rotor to the recess 27 of the other rotor.

After the line elements 23 have been moved from the recesses 27 of the rotors R1-1 to R1-5 to the recesses 27 of the rotors R3-1 to R3-3, the rotors R3-1 to R3-3 are rotated by one revolution or over (two revolutions in the present embodiment) to twist-the three line elements 23 inserted-in the. recesses 27 of the respective rotors R3-1 to R3-3 (two line elements only are illustrated with respect to the rotors R3-1 and R3-2) and thereby form second knots K2 downstream of the rotors R3-1 to R3-3 and upstream of the first knots K1 in each of the spaces in which the rotors R3-1 to R3-3 are disposed.

(4) Step of Forming a Third Knot K3

Figure 16:
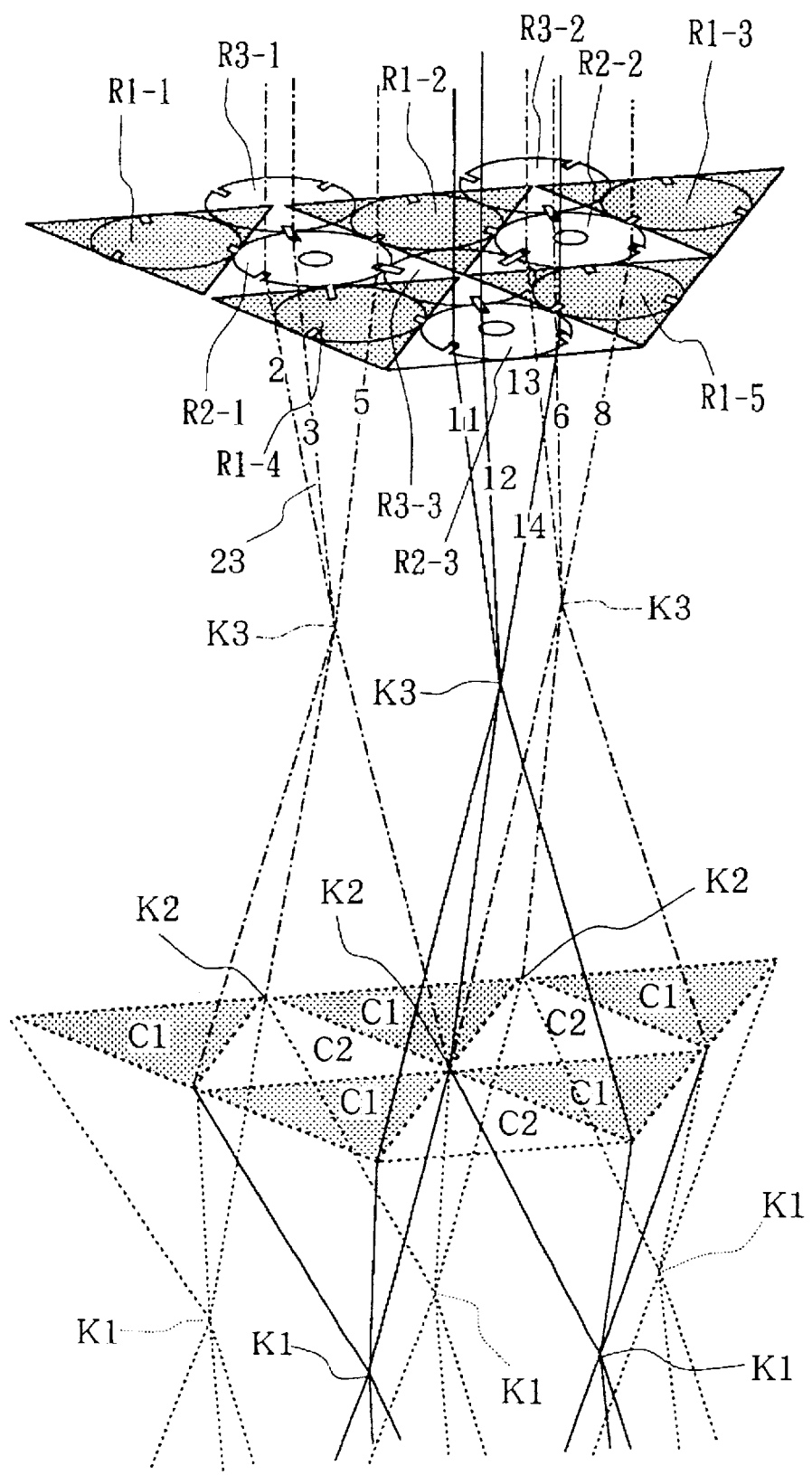
FIG. 16 is a perspective view showing a process for forming a third knot K3 in the same method.

After the line elements 23 are fed by the predetermined length, as shown in FIG. 16, the rotors R3-1 to R3-3 are rotated counterclockwise by 60° and the rotors R2-1 to R2-3 are rotated clockwise by 60°. Then, the line elements 23 are moved from the recesses 27 of the rotors R3-1 to R3-3 to the recesses 27 of the rotors R2-1 to R2-3. More specifically, the line element No. 3 is moved from the rotor R3-1 to the rotor R2-1, the line element No. 5 is moved from the rotor R3-1 to the rotor R2-1, the line element No. 6 is moved from the rotor R3-2 to the rotor R2-2, the line element No. 12 is moved from the rotor R3-3 to the rotor R2-3 and the line element No. 13 is moved from the rotor R3-3 to the rotor R2-2.

Then, the rotors R2-1 to R2-3 are rotated by one revolution or over (two revolutions in the present embodiment) to twist the three line elements 23 inserted in the recesses 27 of the rotors R2-1 to R2-3 and third knots K3 are thereby formed downstream of the rotors and upstream of the second knots K2 in the hypothetical channels C2.

(5) Step of Forming Fourth Knots K4

Figure 17:
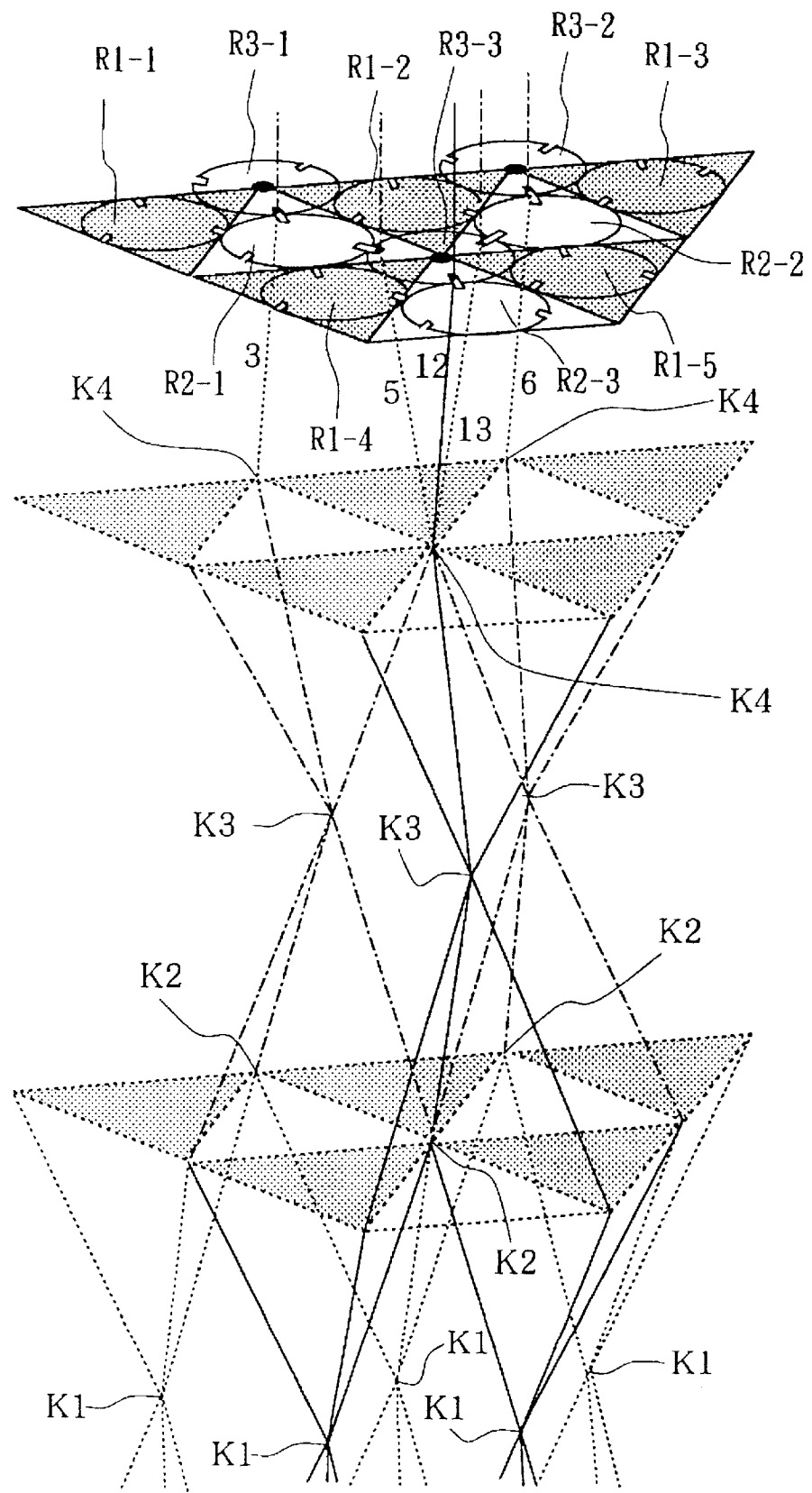
FIG. 17 is a perspective view showing a process for forming a fourth knot K4 in the same method.
Figure 18:
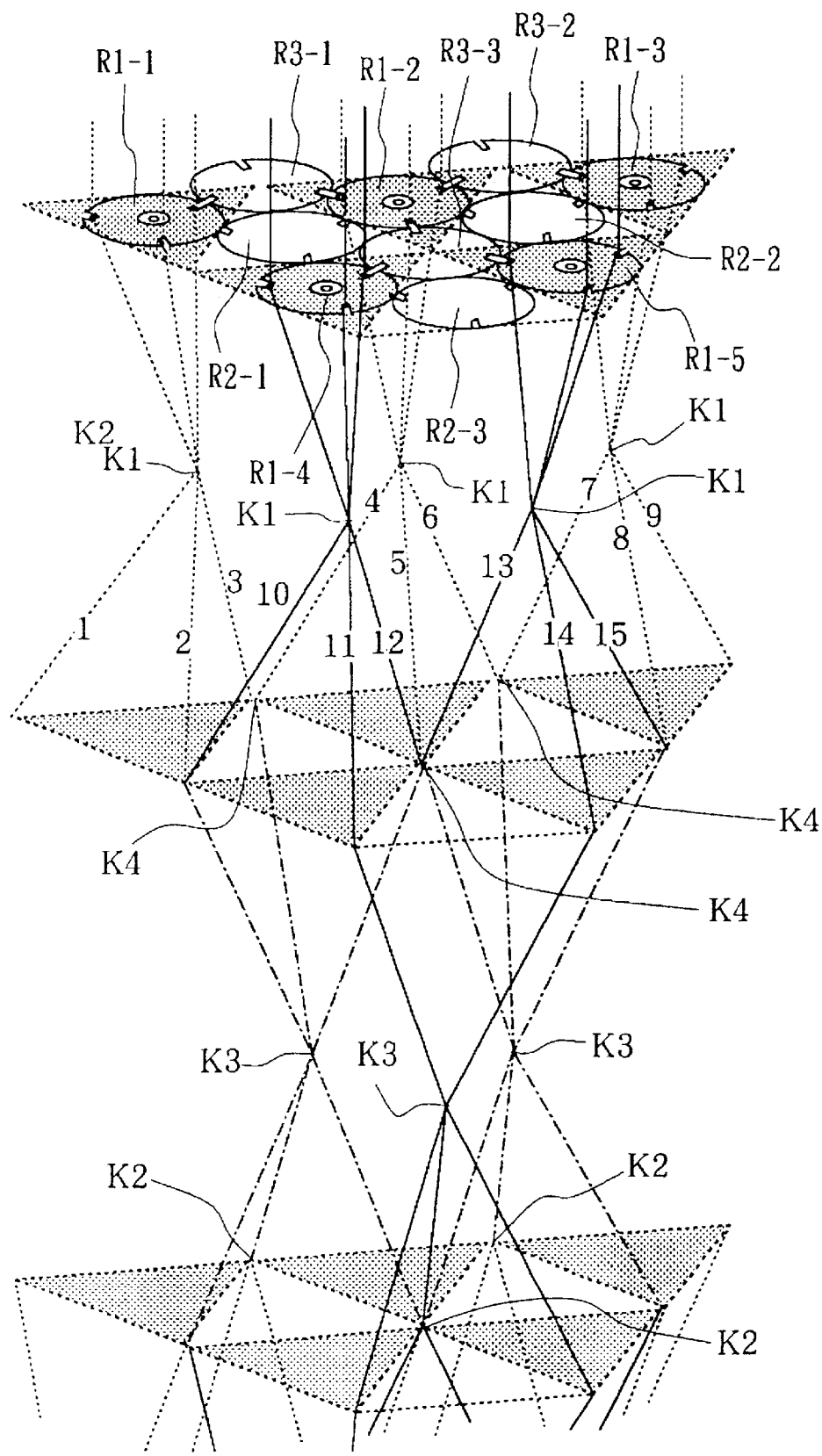
FIG. 18 is a perspective view showing a process for moving the line element to the rotor R1.

After the line elements 23 are fed by the predetermined length, as shown. in FIG. 17, the line elements 23 are moved from the recesses 27 of the rotors R2-1 to R2-3 to the recesses 27 of the adjacent rotors R3-1 to R3-3 which are in alignment. More specifically, the line element No. 3 is moved from the rotor R2-1 to the rotor R3-1, the line element No. 5 is moved from the rotor R2-1 to the rotor R3-3, the line element No. 6 is moved from the rotor R2-2 to the rotor R3-2, the line element No. 12 is moved from the rotor R2-3 to the rotor R3-3 and the line element No. 13 is moved from the rotor R2-2 to the rotor R3-2.

Then, the rotors R3-1 to R3-3 are rotated by one revolution or over (two revolutions in the present embodiment) to twist the three line elements 23 inserted in the recesses 27 of the rotors R3-1 to R3-3 (one line element only is illustrated with respect to the rotors R3-1 and R3-2) and fourth knots K4 are thereby formed downstream of the rotors and upstream of the third knots K3 in the spaces in which the rotors R3-1 to R3-3 are disposed.

(6) Step of Moving the Line Elements to the Recesses of the Rotors R1

The line elements 23 are fed by the predetermined length and the rotors R3-1 to R3-3 are rotated counterclockwise by 60° and the rotors R1-1 to R1-3 are rotated clockwise by 60° to bring the recesses 27 of the rotors R3-1 to R3-2 in alignment with the recesses 27 of the rotors R1-1 to R1-3. Then, the line elements 23 are moved from the recesses 27 of the rotors R3-1 to R3-3 to the recesses 27 of the rotors R1-1 to R1-3. More specifically, the line element No. 3 is moved from the rotor R3-1 to the rotor R1-1, the line element No. 5 is moved from the rotor R3-3 to the rotor R1-2, the line element No. 6 is moved from the rotor R3-2 to the rotor R1-2, the line element No. 12 is moved from the rotor R3-3 to the rotor R1-2 and the line element No. 13 is moved from the rotor R3-3 to the rotor R1-5.

Thus, the initial state (the state of Step (2) described above) is restored in which the line element No. 1 to No. 3 are inserted in the recesses 27 of the rotors R1-1, the line elements No. 4 to No. 6 are inserted in the recesses 27 of the rotor R1-2, the line elements No. 7 to No.9 are inserted in the recesses 27 of the rotor R1-3, the line elements No. 10 to No. 12 are inserted in the recesses 27 of the rotor R1-4 and the line elements No. 13 to No. 15 are inserted in the recesses 27 of the rotor R1-5. By rotating the rotors R1-1 to R1-5 in this state, the first knots K1 are formed again.

Figure 19:
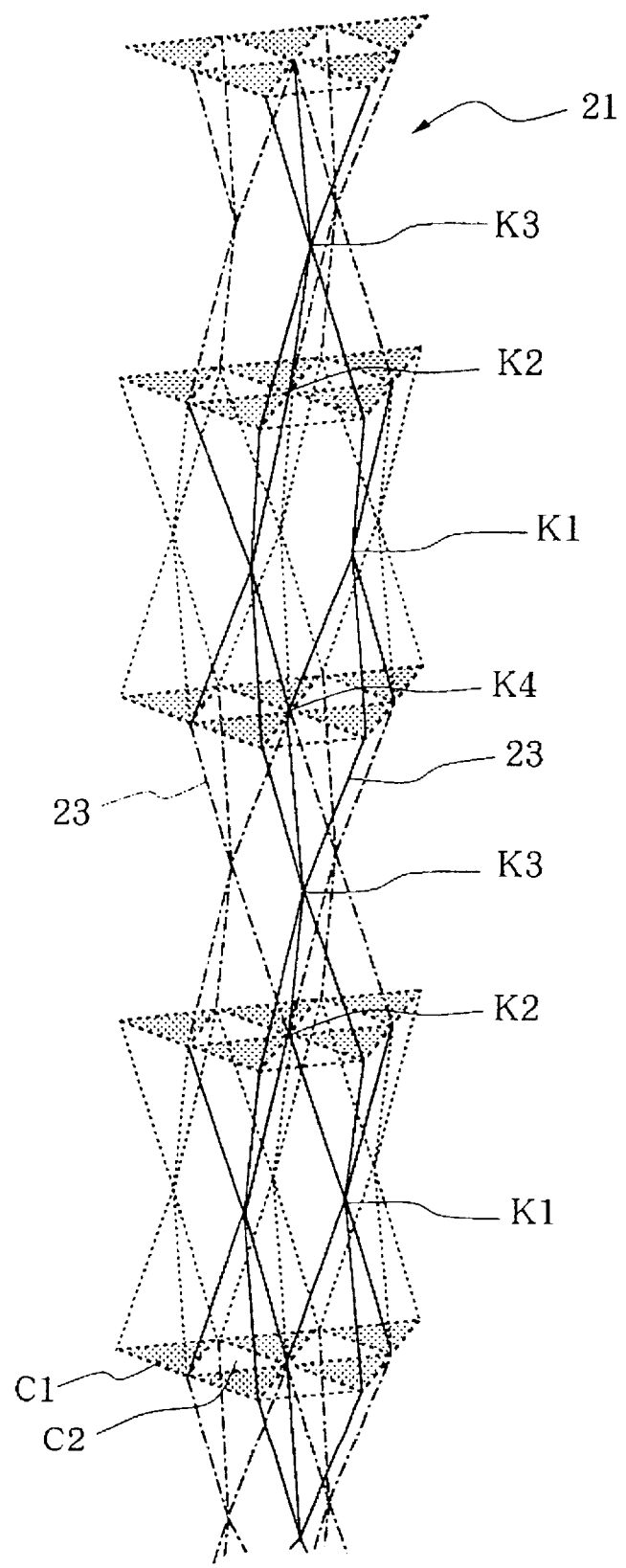
FIG. 19 is a perspective view showing the manufactured three-dimensional net-like structure.

By repeating the steps (2), (3), (4), (5) and (6) sequentially, as shown in FIG. 19, knots where the three line elements 23 converge and disperse are sequentially formed in the order of the first knots K1 formed in the hypothetical channel C1, the second knots K2 formed in the spaces in which the rotors R3 are disposed, the third knots K3 formed in the hypothetical channels C2, the fourth knots K4 formed in the spaces in which the rotors R3 are disposed. By repeating this cycle by a desired number of times, the three-dimensional net-like structure 21 of a desired size can be manufactured.

Embodiment 2

Figure 3:
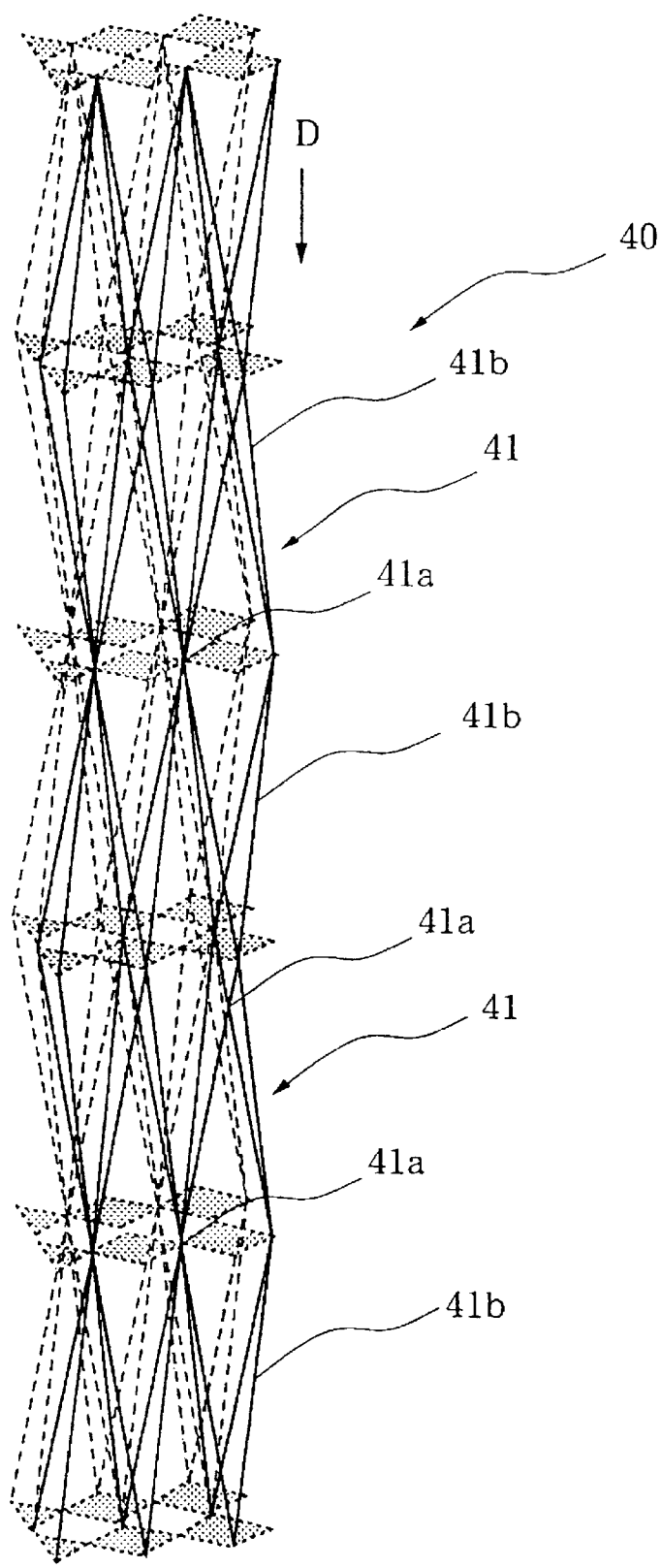
FIG. 3 is a schematic perspective view showing another example of a three-dimensional net-like structure.
Figure 4:
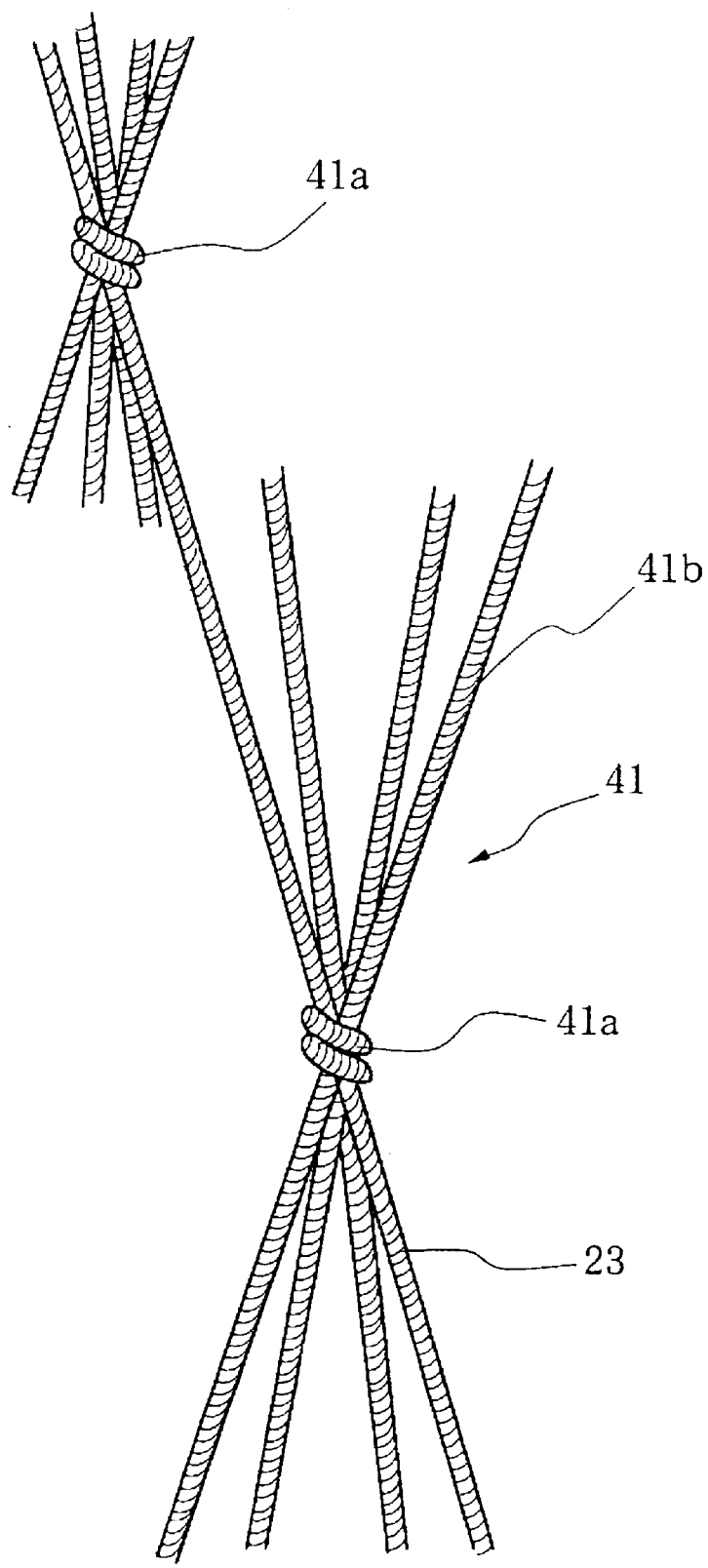
FIG. 4 is a perspective view showing a unit structure used in this example.

This embodiment relates to a method for manufacturing the three-dimensional net-like structure 40 shown in FIGS. 3 and 4 which the unit structure is formed by conversion and diversion of four line elements.

(1) Step of Preparing a Three-dimensional Net-like Structure Manufacturing Space In this embodiment, four line elements 23 are transferred between two types of rotors disposed in two types of hypothetical channels of a regular square cross section and the transferred four line elements 23 are twisted to perform conversion and dispersion of the four line elements 23 whereby the three-dimensional net-like structure shown in FIGS. 3 and 4 is manufactured.

For this purpose, in this embodiment also, a manufacturing device similar to the three-dimensional net-like structure manufacturing device 25 is employed to perform transfer of the line elements 23 between the two types of rotors and rotaion of the rotors and thereby perform conversion and dispersion of the four line elements 23.

Figure 20:
FIG. 20 is a plan view showing an example of a three-dimensional net-like structure manufacturing space used in another embodiment of the method for manufacturing a three-dimensional net-like structure according to the invention.

An example of a three-dimensional net-like structure manufacturing space 42 used in this embodiment is schematically shown in the plan view of FIG. 20.

The three-dimensional net-like structure manufacturing space 42 shown in FIG. 20 consists of a predetermined number (36 channels in the illustrated example) of hypothetical channels each having a regular square cross section which are aligned in columns and rows without leaving spaces between them. These hypothetical channels consist of first hypothetical channels CA which are disposed alternately in each column and in each row of hypothetical channels and second hypothetical channels CB which are disposed alternately in each column and each row of hypothetical channels and disposed between two adjacent first hypothetical channels CA. In the illustrated example, the manufacturing space 42 consists of eighteen first hypothetical channels CA and eighteen second hypothetical channels CB.

Figure 21:
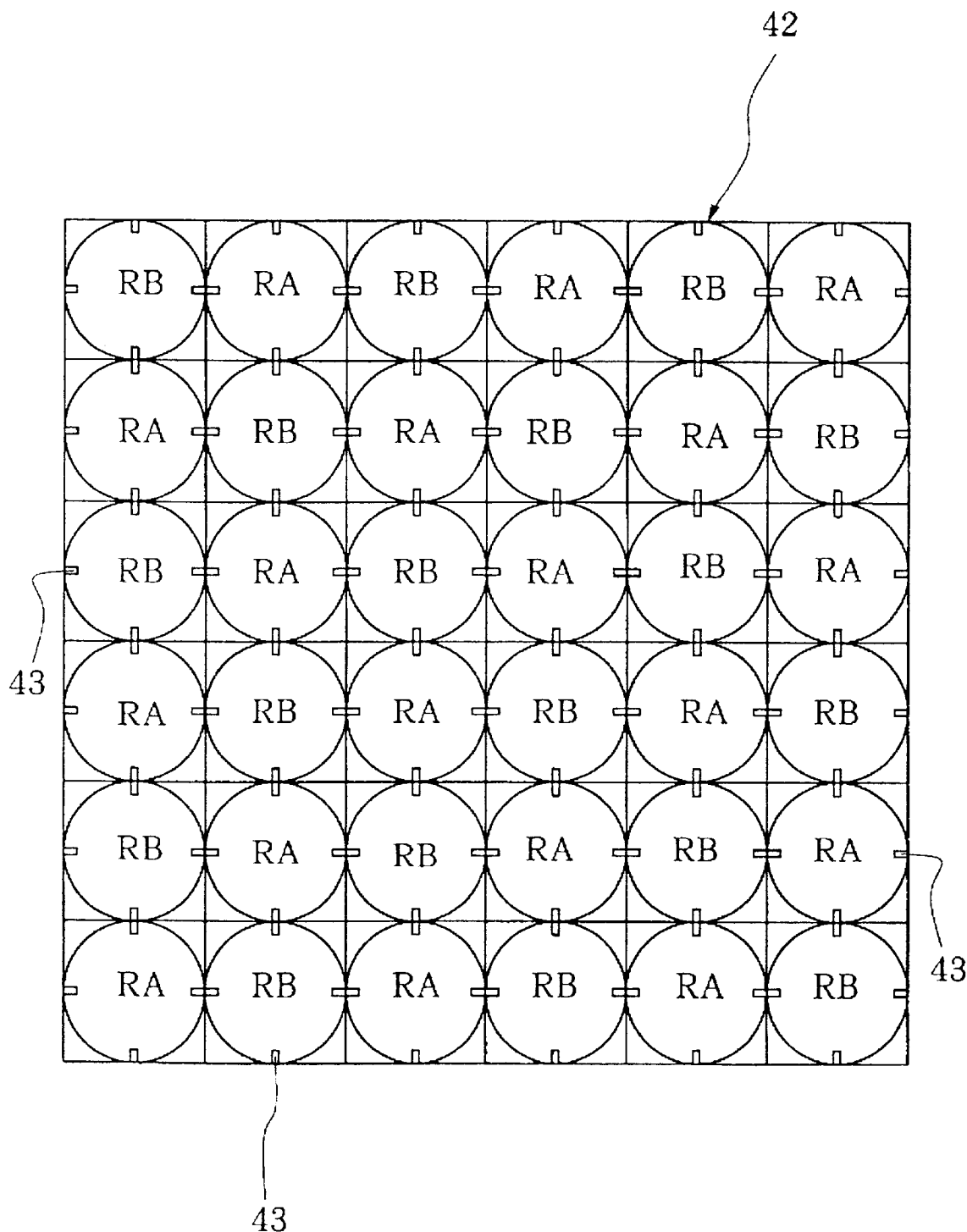
FIG. 21 is a plan view showing rotors disposed in the manufacturing space.

In this manufacturing space 42, as shown in FIG. 21, two types of rotors RA and RB which constitute a part of the manufacturing device 25 are disposed. The rotors RA and RB are constructed in the form of a disk as in the rotors used in the embodiment 1 and are formed in their periphery with U-shaped recesses 43 at an interval of 90° for receiving four line elements 23.

The rotors RA are disposed in the first hypothetical channels CA of the manufacturing space 42 and the rotors RB are disposed in the second hypothetical channels CB of the manufacturing space 42. These rotors RA and RB are of equal diameter. The rotors RA and RB are disposed in such a manner that adjacent ones of the rotors RA and RB are rotated in contact with each other and that the recesses 43 of the rotors RA are in alignment with the recesses 43 of the rotors RB at a position where the rotors RA contact the rotors RB so that the line elements 23 are transferred between the recesses 43 of the rotors RA and the recesses 43 of the rotors RB.

Figure 22:
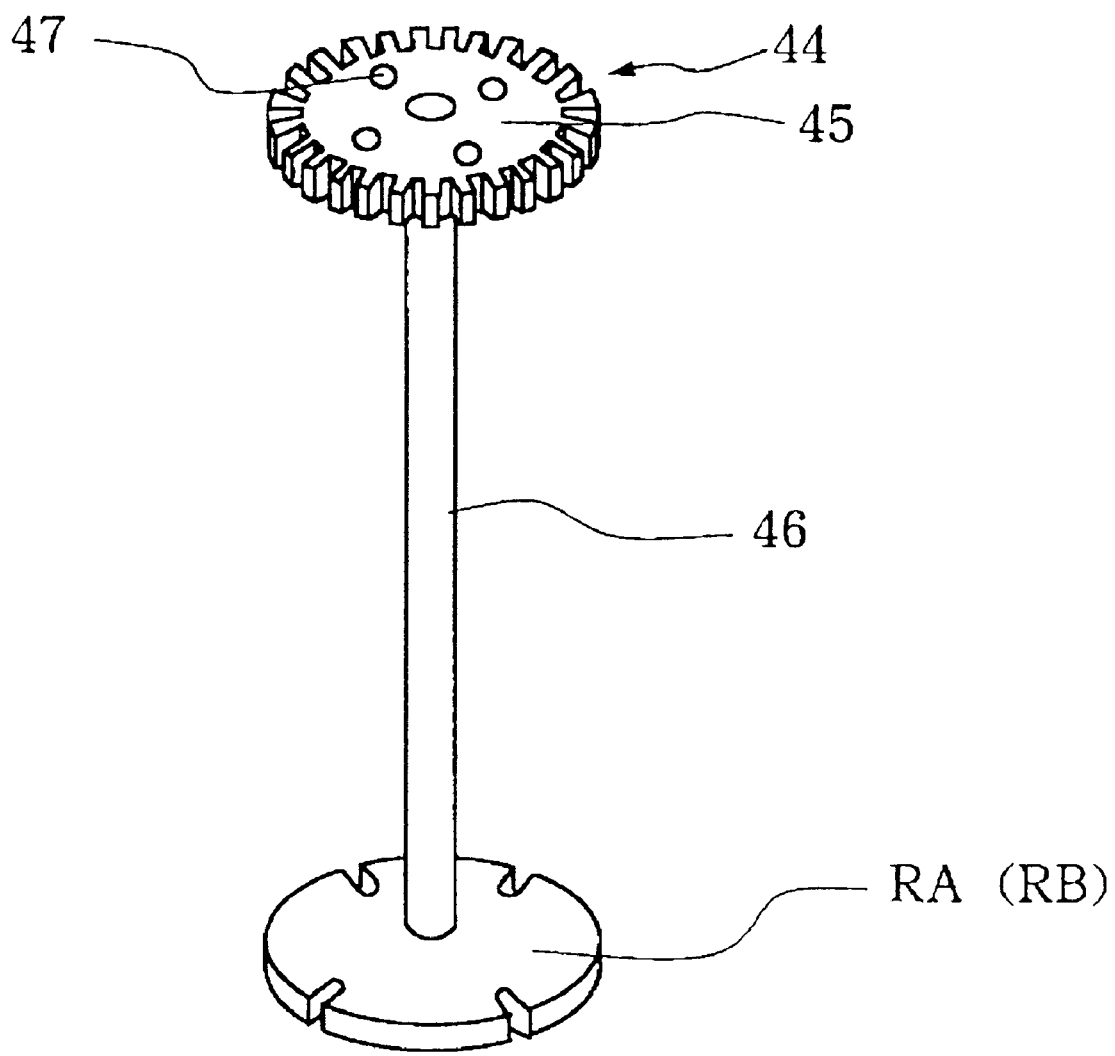
FIG. 22 is a perspective view showing connection between the rotor and the gear of the rotation controller in this embodiment.

As shown in FIG. 22, each of the rotors RA and RB is connected to a gear 45 of a rotation controller 44 provided upstream of the rotors RA and RB in the feeding direction of the line elements 23 by means of a coaxial shaft 46. The gear 45 is of the same diameter and has the same number of teeth as the rotors RA and RB and adjacent gears 45 mesh each other. The gear 45 is formed with line element insertion openings 47 at an interval of 90° for inserting four line elements 23. The gear 45, in the same manner as the gear 29 of the embodiment 1, has only a function of guiding the four line elements 23 unwound from bobbins. In the gear 45, by transmitting rotation of the motor to one of the gears 45, rotation is transmitted to the entire gears 45 and rotation is thereby transmitted to the entire rotors RA and RB. The rotation controller 44 has a sequence control unit for transmitting rotation of the motor to the gears 45 by a desired rotation angle in accordance with a predetermined sequence operation and, therefore, by rotating the gears 45 by a desired angle, the rotors RA and RB can be rotated by the same angle.

(2) Step of Forming a First Knot KCA

The three-dimensional net-like structure 40 is manufactured in the manufacturing space 42 prepared in the above described manner. First, the line elements 23 unwound from bobbins 36 are passed through the line element insertion openings 47 of the gears 45 of the rotation controller 44 corresponding to the rotors RA and the recesses 43 of the rotors RA and then the foremost ends of the line elements 23 are fixed to line element fixing positions corresponding to the recesses 43 of the rotors RA in a line element fixing plate (not shown) provided at a position in the manufacturing space 42 which is downstream of the rotors RA, RB by a predetermined distance in the feeding direction of the line elements 23.

In the following description made with reference to FIGS. 23 and 24, for convenience of explanation, six rotors RA and four rotors RB among eighteen rotors RA and eighteen rotors RB are designated by reference characters RA-1 to RA-6 and RB-1 to RB-4 and operation of the line elements 23 by these rotors RA-1 to RA-6 and RB-1 to RB-4 will be described. Operation of the line elements 23 by the other rotors RA and RB shown in FIG. 21 is entirely the same as the operation by the rotors shown in FIG. 24.

For conveniecen of explanation, twenty line elements 23 inserted in the recesses 43 of the rotors RA-1 to RA-6 are distinguished from one another by reference characters No. 1 to No. 20. In the step shown in FIG. 23, the line elements No. 1 to No. 4 are received in the rotor RA-1, the line elements No. 5 to No. 8 are received in the rotor RA-2, the line elements No. 9 and No. 10 are received in the rotor RA-3, the line elements No. 11 to No. 14 are received in the rotor RA-4, the line elements No. 15 to No. 18 are received in the rotor RA-5 and the line elements No. 19 and No. 20 are received in the rotor RA-6. The shaded plane P in FIG. 23 represents positions where the line elements 23 are received in the rotors RA and RB.

By rotating the gears 45 of the rotation controller 44 by one revolution or over (two revolutions (720°) in the present embodiment) in the above described state, the rotors RA-1 to RA-6 are rotated by the same rotation angle. The four line elements 23 inserted in the recesses 43 of the rotors RA-1 to RA-6 are twisted in a middle position between the rotors RA-1 to RA6 and the line element fixing plate and knots KCA which are similar to the knot 41a shown in FIG. 4 which is formed by twisting are formed. Thus, the first knots KCA are formed downstream of the rotors in the hypothetical channels CA in the feeding direction of the line elements 23.

(3) Step of Forming a Second Knot KCB

Figure 23:
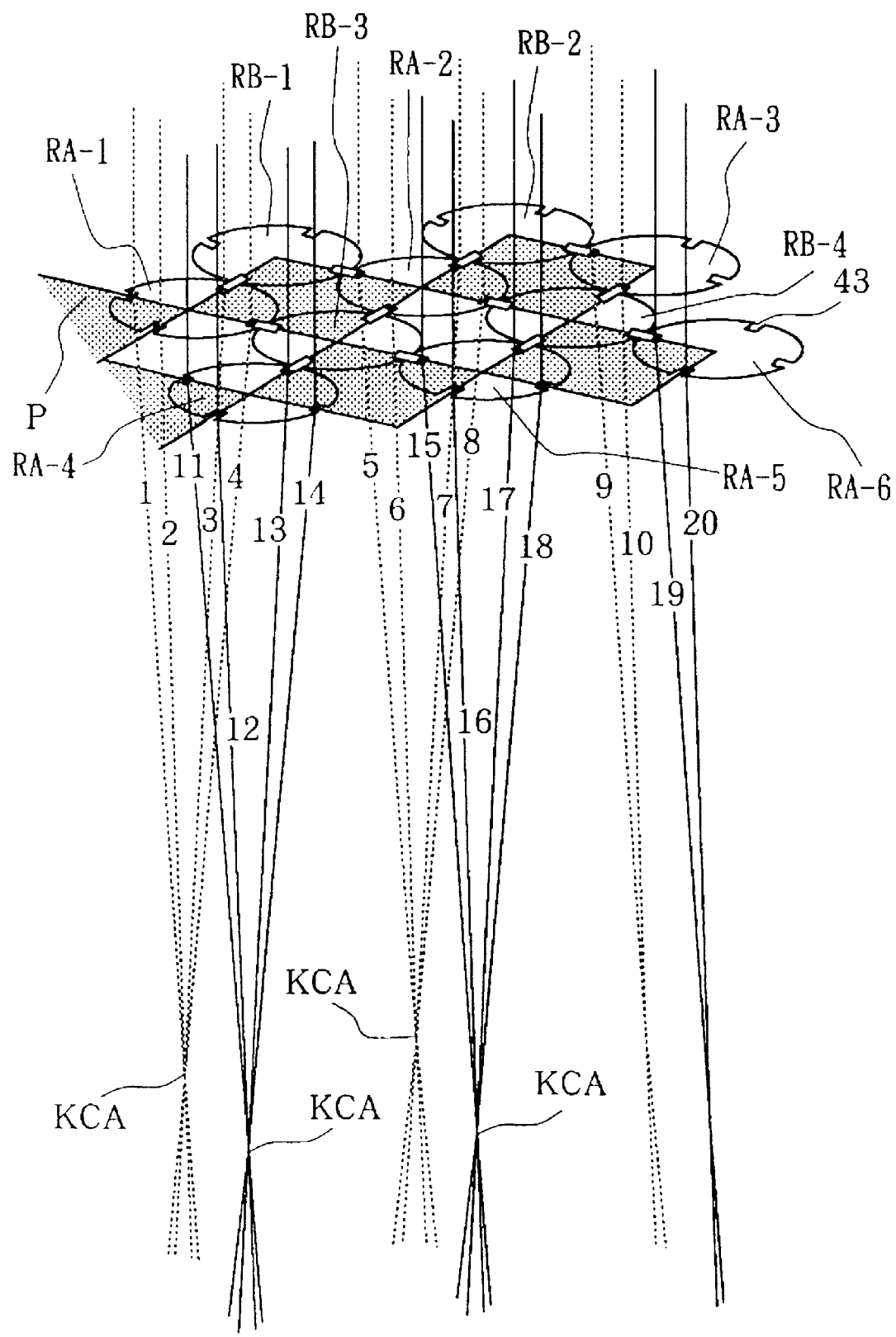
FIG. 23 is a perspective view showing a process for forming a first knot KCA in this embodiment.
Figure 24:
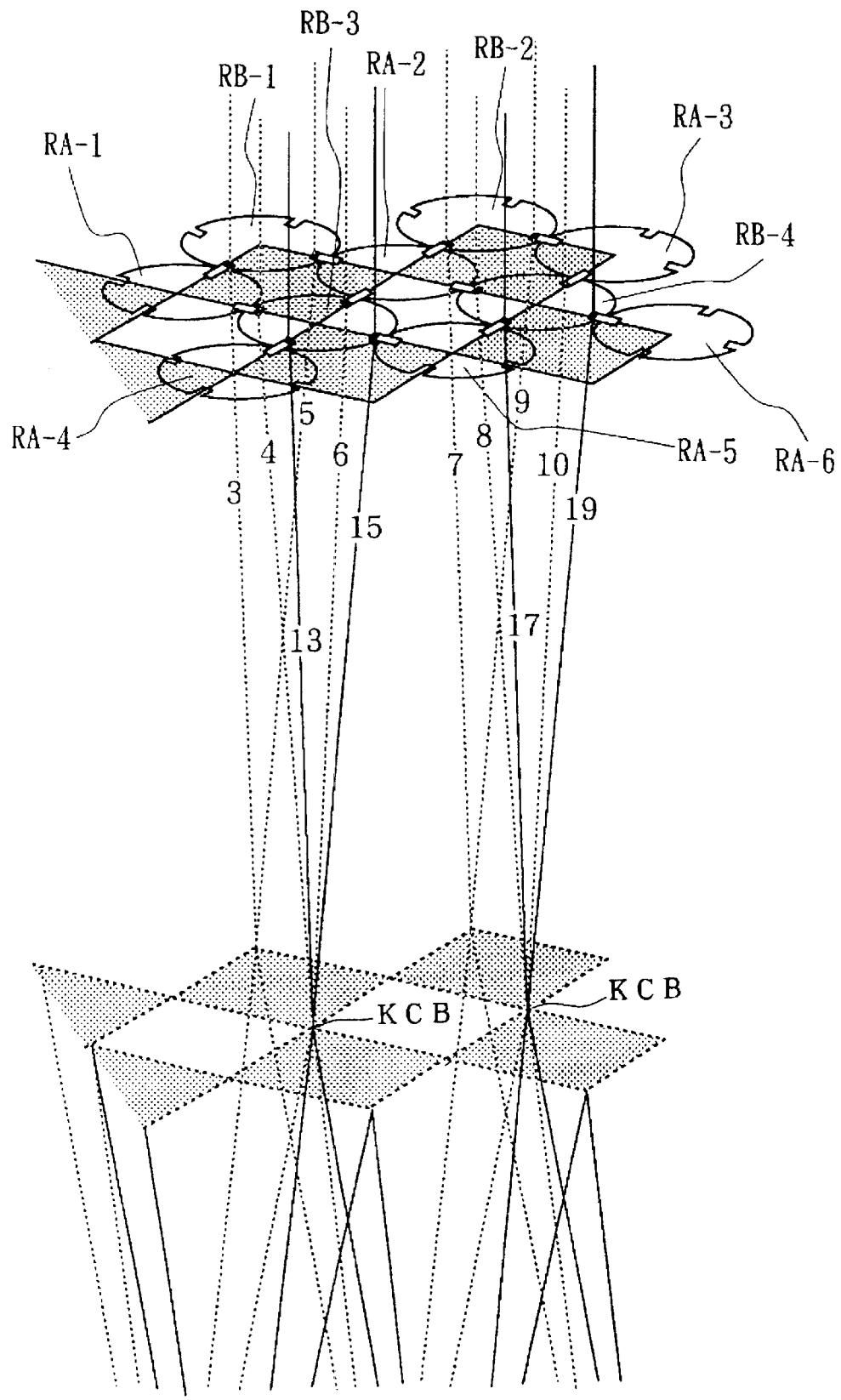
FIG. 24 is a perspective view showing a process for forming a second knot KCB in this embodiment.

The line elements 23 are fed in the feeding direction by a predetermined length (in the present embodiment, length between the first knots KCA and the recesses 43 of the rotors RA-1 to RA-6 in FIG. 23). Then, as shown in FIG. 24, the line elements 23 are moved from the recesses 43 of the rotors RA-1 to RA-6 to the recesses 43 of adjacent rotors RB-1 to RB-4 which are in alignment. More specifically, the line element No. 3 is moved from the rotor RA-1 to the rotor RB-1, the line element No. 4 is moved from the rotor RA-1 to the rotor RB-3, the line element No. 5 is moved from the rotor RA-2 to the rotor RB-3, the line element No. 7 is moved from the rotor RA-2 to the rotor RB-2, the line element No. 8 is moved from the rotor RA-2 to the rotor RB-4, the line element No. 9 is moved from the rotor RA-3 to the rotor RB-2, the line element No. 10 is moved from the rotor RA-3 to the rotor RB-4, the line element No. 13 is moved from the rotor RA-4 to the rotor RB-3, the line element No. 15 is moved from the rotor RA-5 to the rotor RB-3, the line element No. 17 is moved from the rotor RA-5 to the rotor RB-4 and the line element No. 19 is moved from the rotor RA-6 to the rotor RB-4.

Then, the rotors RB-1 to RB-4 are rotated by one revolution or over (two revolutions in the present embodiment) to twist the four line elements 23 inserted in the recesses 43 of the rotors RB-1 to RB-4 (two line elements only are illustrated with respect to each of the rotors RB-1 and RB-2) and second knots KCB are thereby formed downstream of the rotors and upstream of the first knots KCA in the hypothetical channels CB.

(d) Step of Moving the Line Elements to the Recesses of the Rotors RA

The line elements 23 are fed by the predetermined length and then the line elements 23 are moved from the recesses 43 of the rotors RB-1 to RB-4 to the recesses 43 of the adjacent rotors RA-1 to RA-6 which are in alignment.

Thus, the initial state (the state of Step (2) described above) is restored in which the line elements No. 1 to No. 4 are inserted in the rotors RA-1, the line elements No. 5 and No. 6 are inserted in the rotor RA-2, the line elements No. 9 and No.10 are inserted in the rotor RA-3, the line elements No. 11 to No. 14 are inserted in the rotor RA-4, the line elements No. 15 to No. 18 are inserted in the rotor RA-5 and the line elements No. 19 and No. 20 are inserted in the rotor RA-6. By rotating the rotors RA-1 to RA-6 in this state, the first knots KCA are formed again.

By repeating the steps (2), (3) and (4) sequentially and repeatedly, the first knots KCA formed in the hypothetical channels CA and the second knots KCB formed in the hypothetical channels CB are sequentially formed and, by repeating this cycle by a desired number of times, the three-dimensional net-like structure 40 as shown in FIG. 3 can be manufactured in a desired size.

Figure 25:
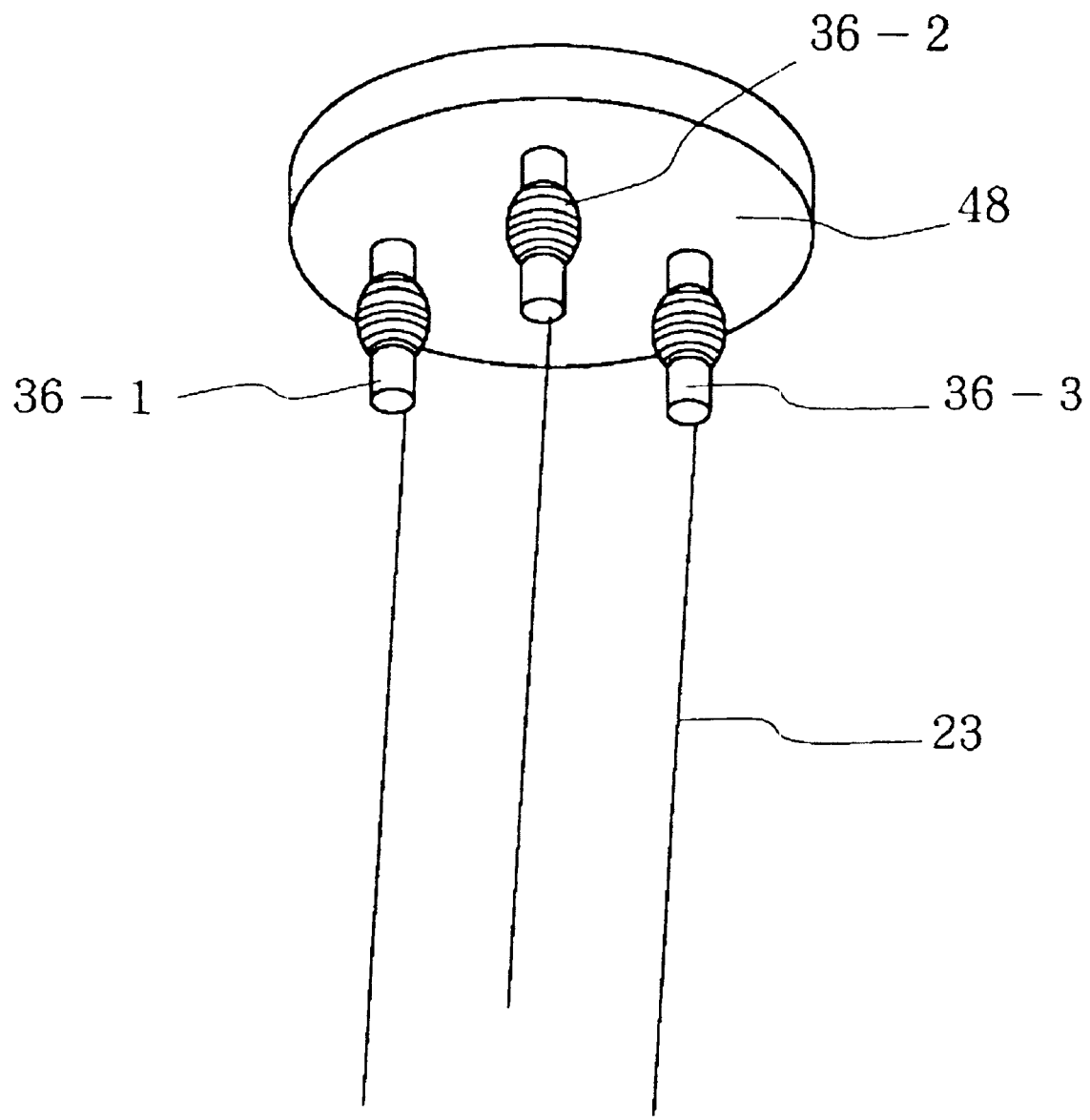
FIG. 25 is a perspective view showing an example of means for preventing twisting of line element on the bobbin side.
Figure 26:
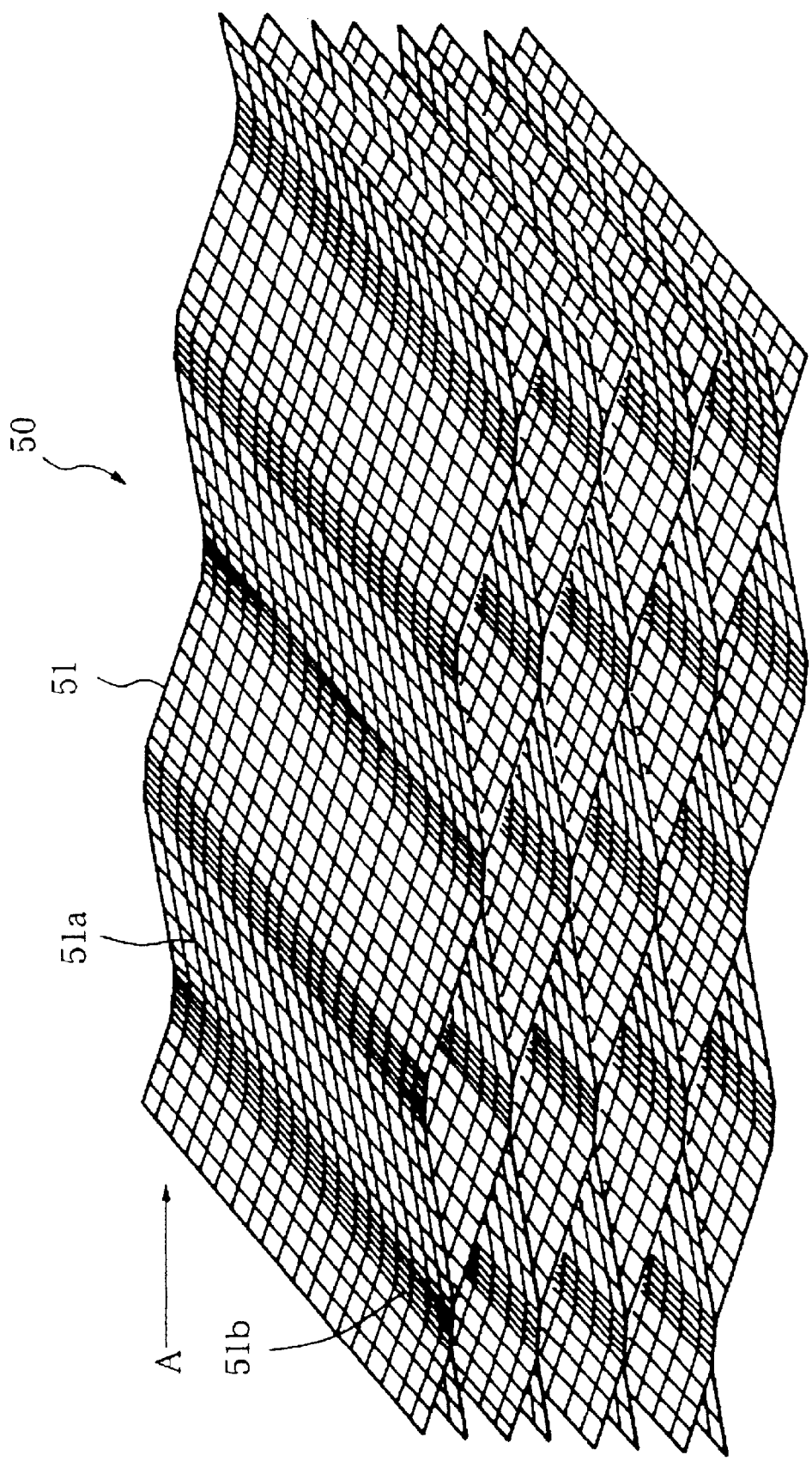
FIG. 26 is a perspective view showing the prior art method for manufacturing an X-packing.

In the embodiments 1 and 2, when the gears 29 (45) of the rotation controller 28 (44) of the three-dimensional net-like structure manufacturing device 25 are rotated by one revolution or over, twisting is caused in the three or four line elements at a position between the gears 29 (45) and the bobbins 36 and, therefore, some means must be provided for preventing occurrence of such twisting in the line elements 23. For this purpose, in a case, for example, where a three-dimensional net-like structure having a unit structure consisting of three line elements is manufactured, as shown in FIG. 25, three bobbins 36-1, 36-2 and 36-3 from which the three line elements 23 inserted through the gears 29 are unwound may be fixed to a common bobbin rotating disk 48. By rotating the bobbin rotating disk 48 by a bobbin rotating disk drive mechanism (not shown) provided in the bobbin section 37 in synchronism with rotation of the gears 29 by the same rotation angle as the rotation of the gears 29 in the same direction, twisting of the line elements 23 can be prevented.

In the above described embodiments of the invention, the rotor are made in the shape of a disk. The shape of the rotors is not limited to the disk but rotors which have a circular shape in the radial direction such as a cylindrical shape may also be used.

In the above described embodiments, the rotors which transfer the line elements are rotated by the gears 29 or 45 of the rotation controller 28 or 44. The rotors may be rotated by other methods. An example of such other methods for rotating the rotors will be described with reference to FIGS. 27 to 30 with respect to a case where a three-dimensional net-like structure is manufactured by using three line elements.

Figure 27:
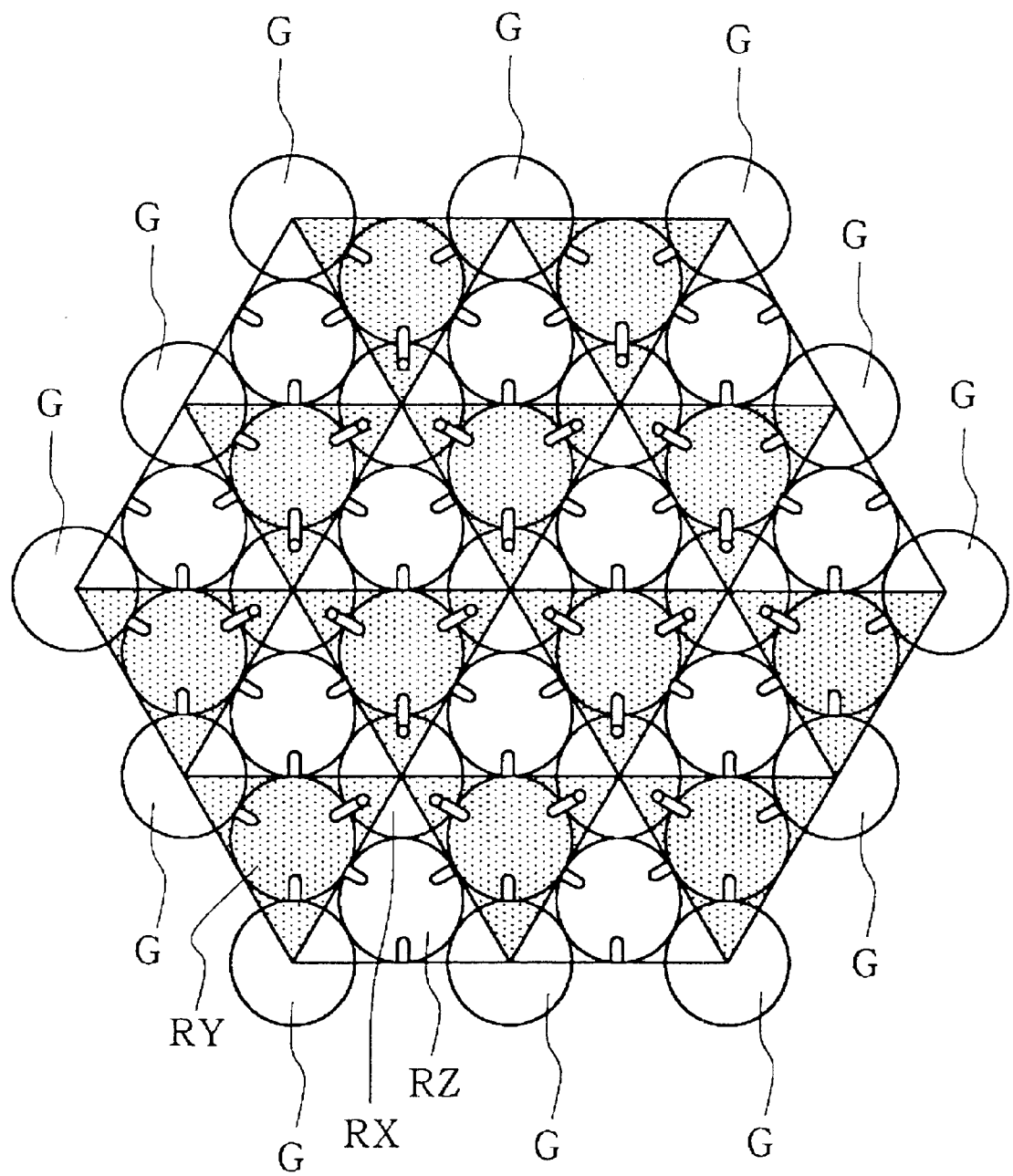
FIG. 27 is a plan view showing another manner for controlling rotation of the rotors.
Figure 28A:
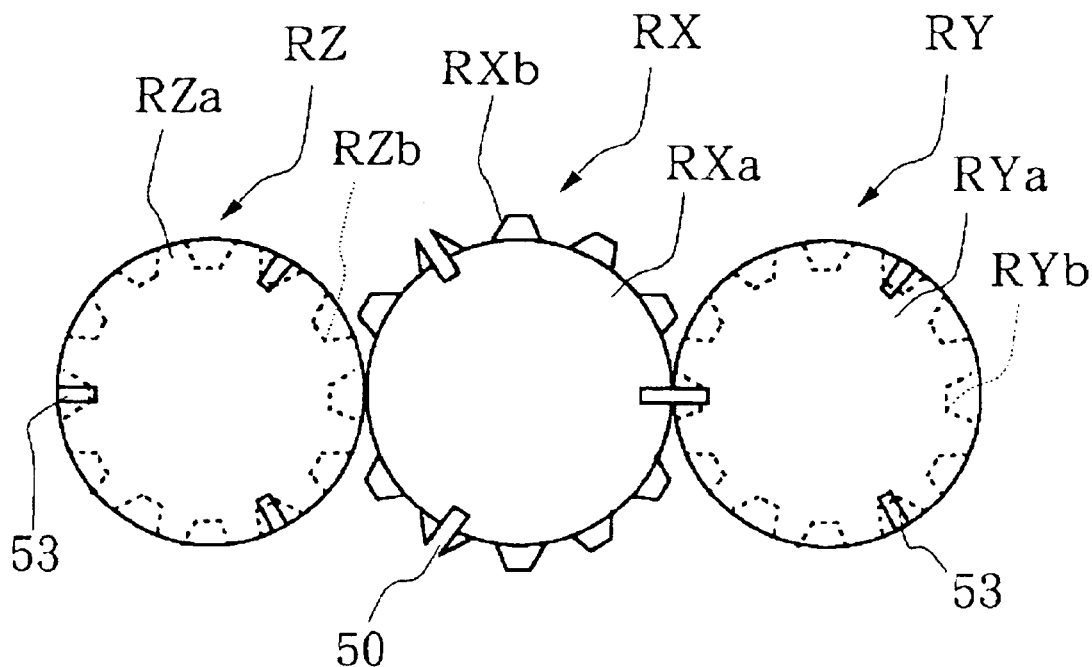
FIG. 28A is a plan view showing structure of a rotor.
Figure 28B:
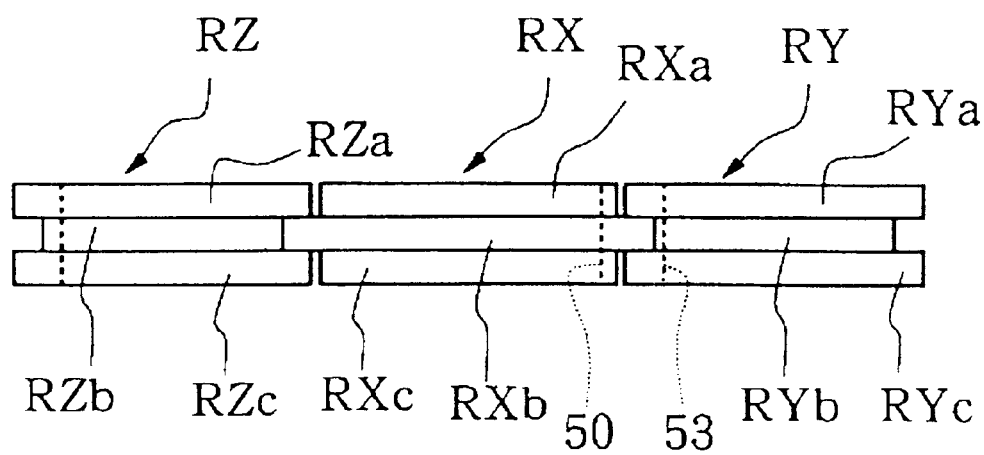
FIG. 28B is a side view showing the structure of the rotor.
Figure 29:
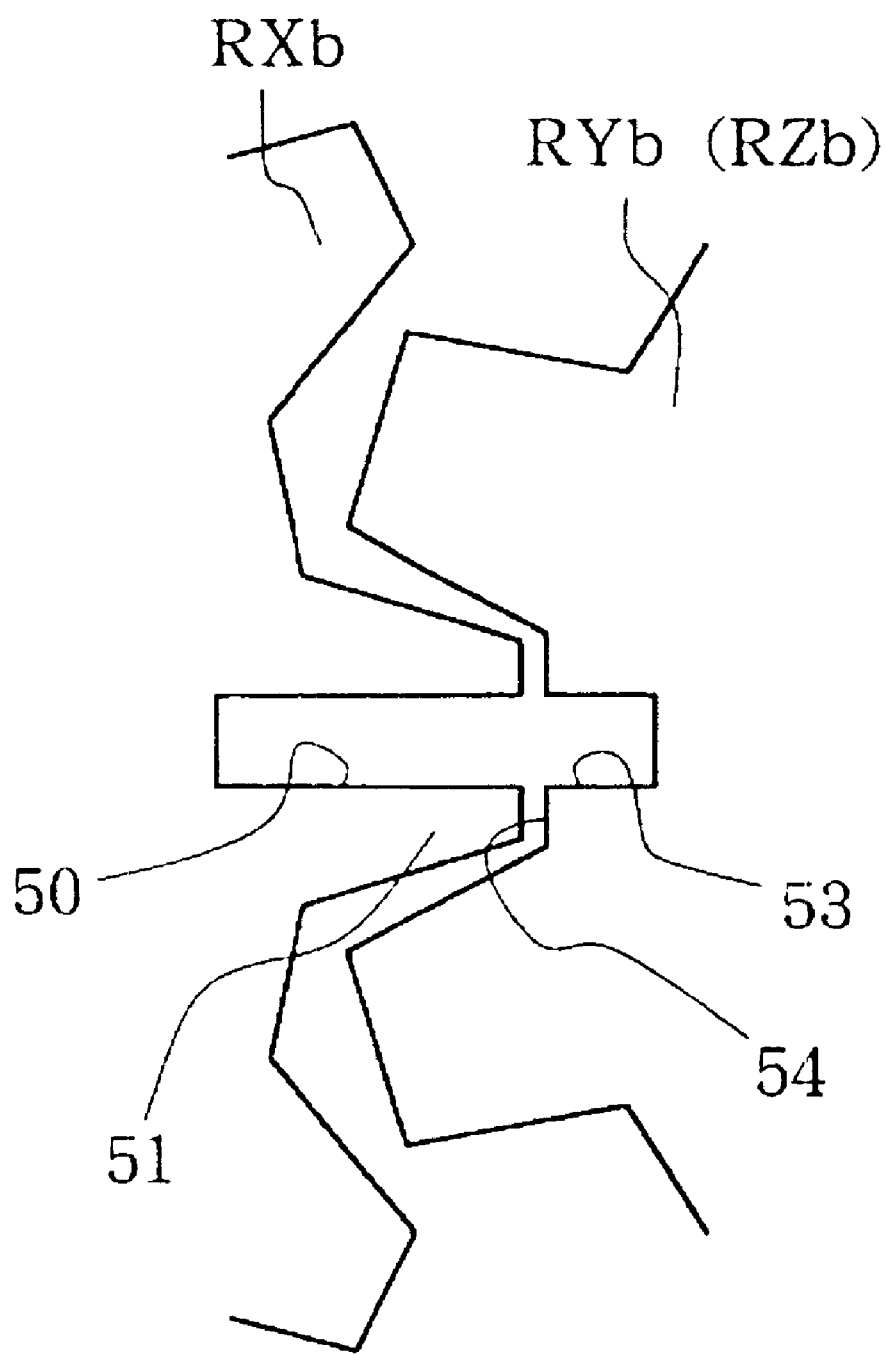
FIG. 29 is a partial enlarged view showing meshing of wheels.
Figure 30:
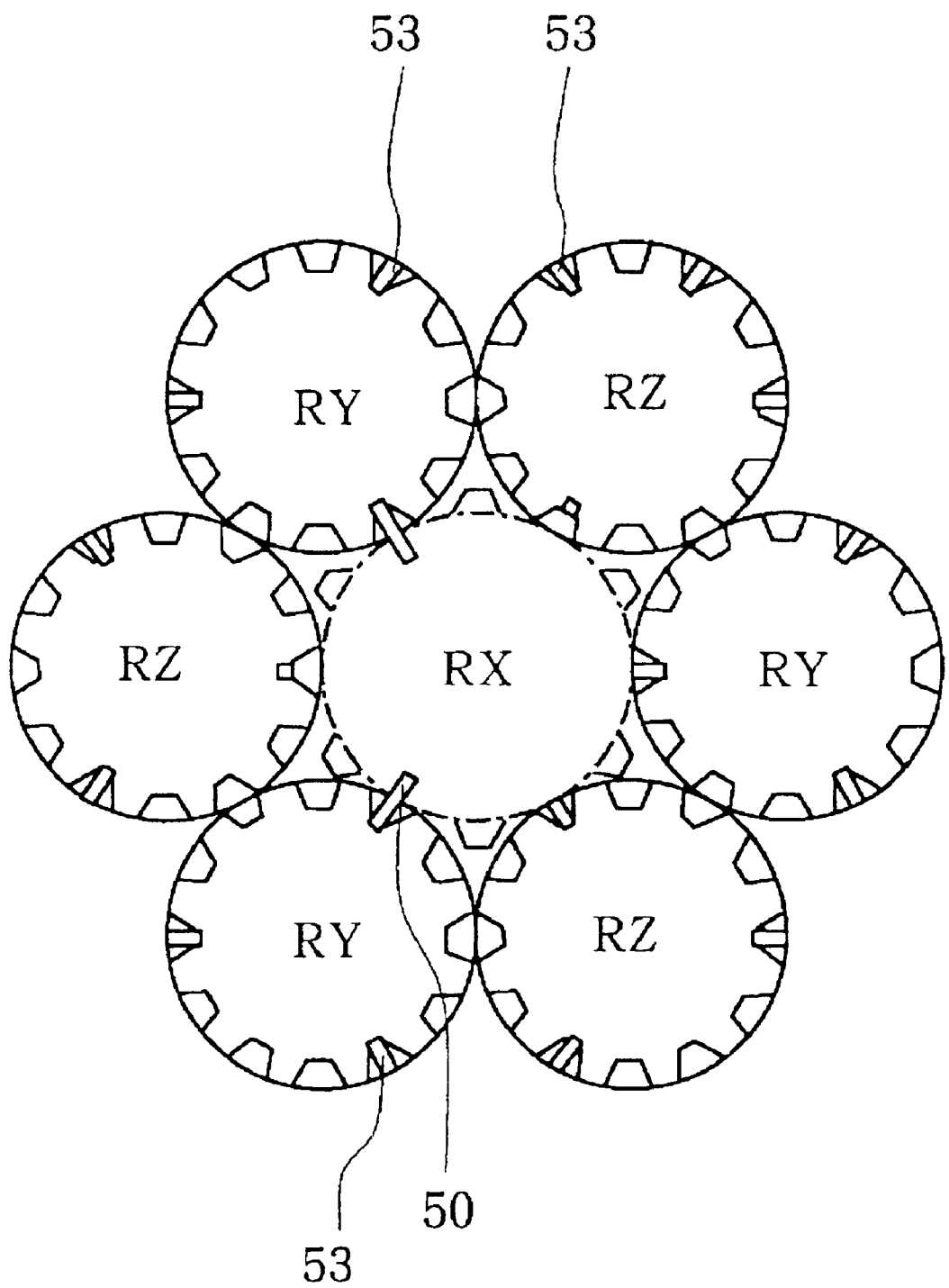
FIG. 30 is a plan view showing a wheel section and lower rotor section of rotors RX, RY and RZ.
Figure 31A:
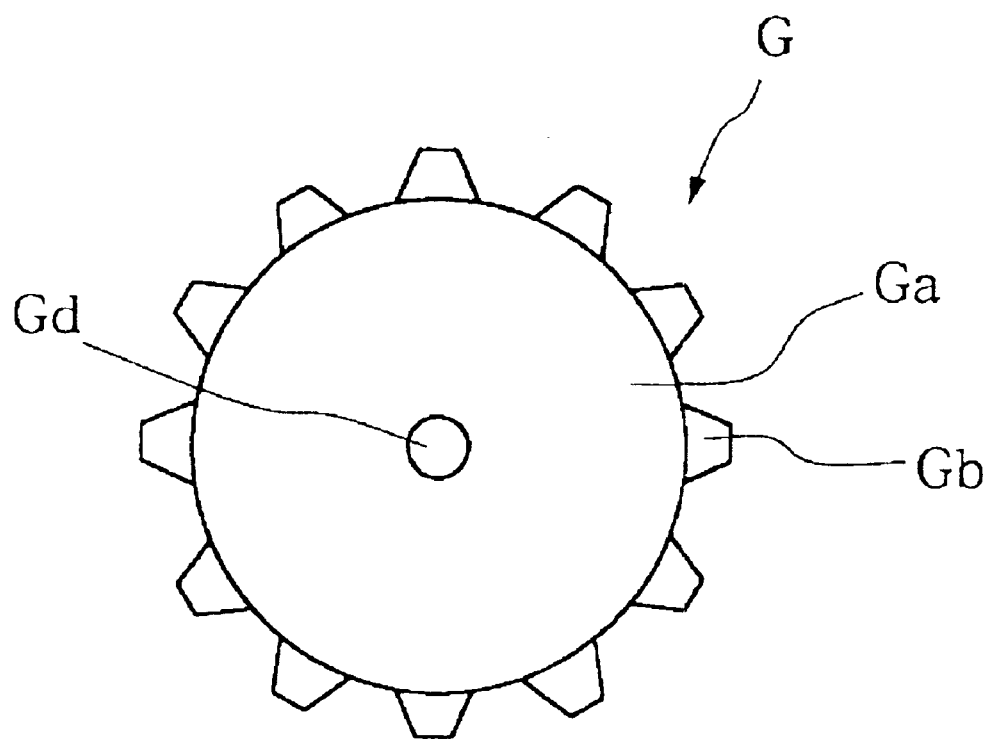
FIG. 31A is a plan view of a drive wheel G.
Figure 31B:
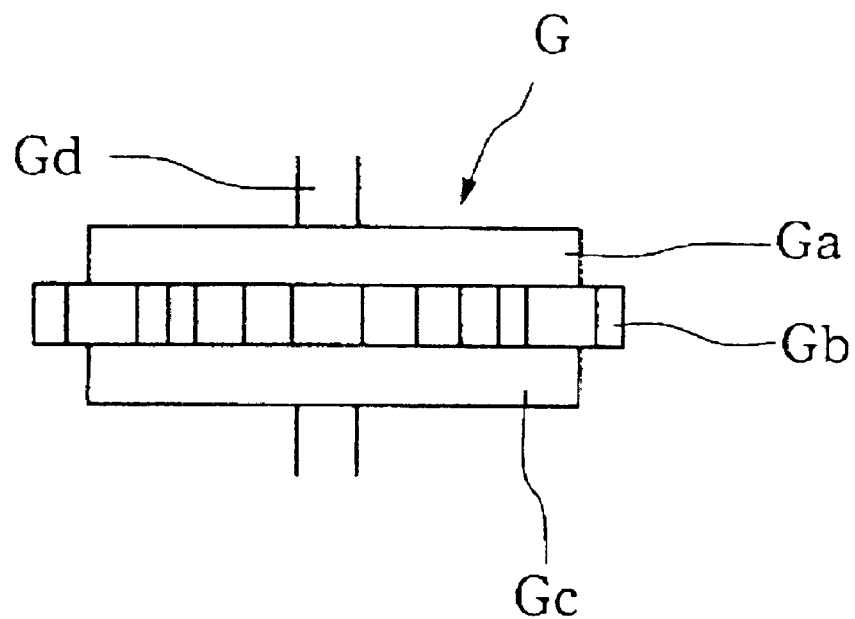
FIG. 31B is a side view of the drive wheel G.

FIG. 27 is a plan view showing arrangement of rotors in practicing this method in the manufacturing space shown in FIG. 8, FIG. 28A is a plan view of adjacent rotors RX, RY and RZ in FIG. 27, FIG. 28B is a side view thereof, FIG. 29 is a partially enlarged view showing alignment of recesses in gear portions of the rotor RX and the rotor RY (or RZ), FIG. 30 is a plan view showing gear sections and lower rotor sections of the rotors RX, RY and RZ with the rotor RX being placed in the center, FIG. 31A is a plan view of a drive gear G and FIG. 31B is a side view thereof.

In FIG. 27, the rotors RX perform the function of the rotors R3, the rotors RY the function of the rotors R1 and the rotors RZ the function of the rotors R2 of FIG. 8. The rotors RX, RY and RZ have, as shown in FIGS. 28A and 28B, upper rotor sections RXa, RYa and RZa, gear sections RXb, RYb and RZb, and lower rotor sections RXc, RYc and RZc with the gear sections RXb, RYb and RZb being sandwiched between the upper rotor sections RXa, RYa and RZa and the lower rotor sections RXc, RYc and RZc. The upper rotor section of the rotors RX, RY and RZ has an equal diameter to the lower rotor section thereof In the same manner as in the embodiment of FIG. 8, a small gap is provided between the upper rotor sections of the respective rotors and between the lower rotor sections of the respective rotors.

The periphery of the gear section RXb of the rotor RX projects radially outwardly by a predetermined length from the peripheries of the upper rotor section RXa and the lower rotor section RXb. On the other hand, the peripheries of the gear sections RYb and RZb are withdrawn by the same length from the peripheries of the upper rotor sections RYa and Rza and the lower rotor sections RYc and RZc. Accordingly, the rotors RA, RB and RZ are supported by one another in such a manner that the gear section of the rotor RX is held by the upper rotor sections and the lower rotor sections of the rotors RY and RZ and the rotors RY and RZ are supported by the gear sections of the rotors RX which are adjacent to each of the rotors RY and RZ at three positions which are distant by 120°. All of the rotors RX, RY and RZ in FIG. 27 are supported by one another in mutually fitted state without being supported by outside means except for drive gears G. The number of teeth of the gear section RXb of the rotor RX is equal to the number of teeth of the gear sections RYb and RZb of the rotors RY and RZ.

As will be apparent from FIG. 29, in the gear section RXb of the rotor RX, a recess 50 for receiving and transferring a line element is formed in a manner to extend radially in the central portion of a tooth 51 and reaches a position which is radially inside of the root circle of the tooth 51 and also radially inside of the outer peripheries of the upper rotor section RXa and the lower rotor section RXc. The portion of the recess 50 which is radially inside of the root circle extends vertically to the upper rotor section RXa and the lower rotor section RXc so that a vertically continuous recess is formed in the rotor RX. Three recesses 50 are formed at an interval of 120° in the tooth 51.

In the gear section RYb of the rotor RY and the gear section RZb of the rotor RZ, a recess 53 is formed in a manner to extend radially inside of the root 54. Three recesses 53 are formed at an interval of 120° in the rotors RY and RZ. The recess 53 extends vertically to the upper rotor section RYa and the lower rotor section RYc in the rotor RY and to the upper rotor section RZa and the lower rotor section RZc in the rotor RZ so that a vertically continuous recess is formed in the rotors RY and RZ. In the illustrated state, the recess 50 of the rotor RX is in alignment with the recess 53 of the rotor RY.

The meshing state of the rotors RX, RY and RZ as viewed from one rotor RX being placed in the center is shown in FIG. 30. This is a plan view in which, for convenience of understanding, illustration of the upper rotor sections of the respective rotors is omitted and the lower rotor sections only are illustrated. As will be apparent from FIG. 30, the gear section of the rotor RX meshes with the gear sections of the rotors RY and RZ but the gear sections of the rotors RY and RZ do not mesh with each other. Therefore, rotation is transmitted between the rotor RX and the rotors RY and RZ but rotation is not transmitted between the rotor RY and the rotor RZ.

The drive gears G which are dispoded along the outer periphery of the rotors RX, RY and RZ are constructed in the manner shown in FIGS. 31A and 31B. The drive gear G has, as the rotor RX, an upper rotor section Ga, a lower rotor section Gc and a gear section Gb which is sandwiched between the the upper rotor section Ga and the lower rotor section Gc and projects radially outwardly from the peripheries of these sections Ga and Gc by a predetermined length. The gear section Gb, however, does not have a recess for receiving and transferring a line element. The drive gear G is rotatably supported by a frame of the device through a gear shaft Gd and is driven and rotated by an unillustrated drive unit. The gear sections Gb of these drive gears G mesh with the gear sections RYb and RZb of the rotors RY and RZ. Accordingly, the rotors RY and RZ whose gear sections mesh with the gear section of the drive gears G are supported by the drive gears G and rotation of the drive gears G is transmitted to the entire rotors RX, RY and RZ of FIG. 27 through the rotors RY and RZ. In this embodiment, therefore, the entire gear group except for the drive gears G which are disposed outside does not require any support but necessary rotation can be transmitted to the entire gear group. Accordingly, the gears 29 of the rotation controller 28 in the embodiment 1 are not necessary and the line elements can be supplied directly from bobbins to the rotors RX, RY and RZ. The method for manufacturing the three-dimensional net-like structure is the same as the ones of the embodiments 1 and 2 and description thereof will be omitted.

In manufacturing the three-dimensional net-like structure using four line elements, the structure of the rotor RX can be applied to the rotor RA and the structure of the rotor RY (or RZ) can be applied to the other rotor RB so that support and rotation of the rotors RA and RB can be realized without using the gears 45 of the rotation controller 44.

In the example of FIG. 15, the line element is pushed to move by operating the arm 49. An alternative method for moving the line element from a recess of one rotor to a recess of another rotor will be described with reference to FIGS. 32 and 33.

Figure 32:
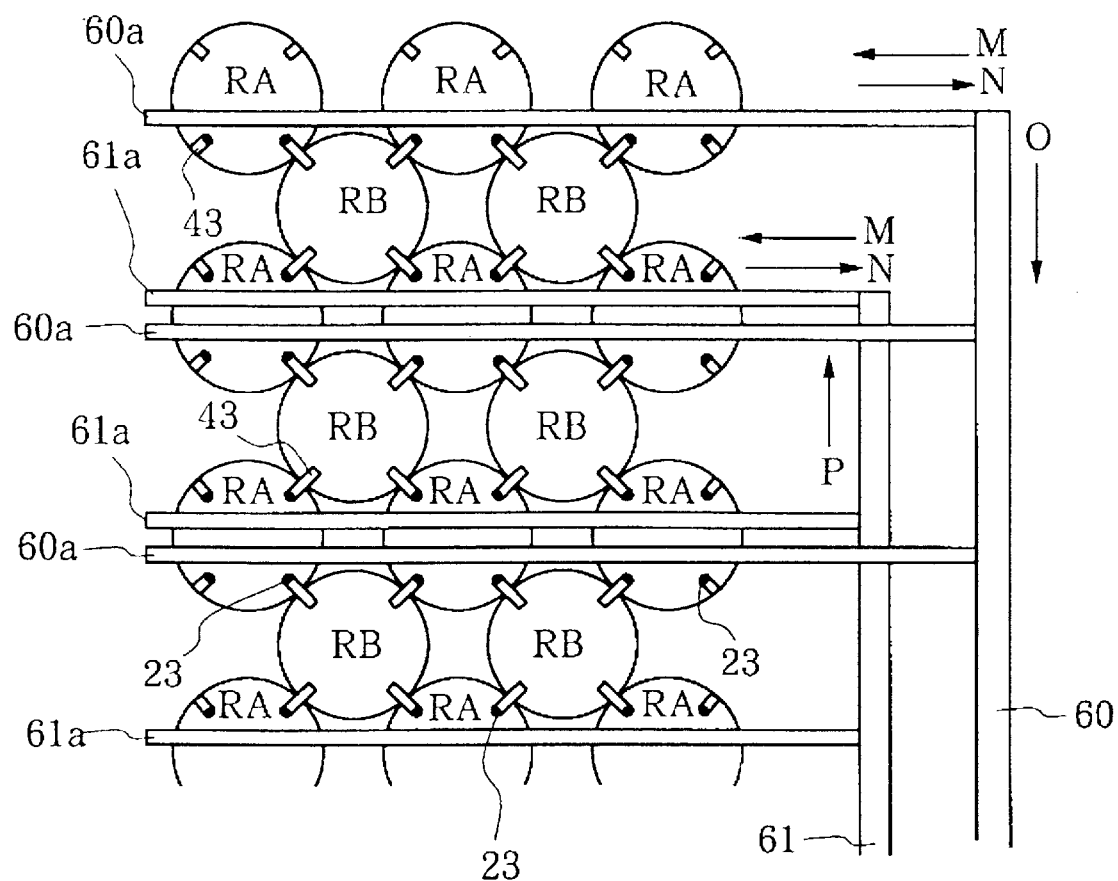
FIG. 32 is a plan view showing another manner of moving the line elements from the rotors RA to the rotors RB.

FIG. 32 is a plan view showing an example in which this method has been applied to the embodiment fo FIGS. 20 to 24 for manufacturing the three-dimensional net-like structure by using four line elements. In the illustrated state, the line elements 23 are inserted in the recesses 43 of the rotors RA. For moving the line elements 23 from this state to the recesses 43 of the adjacent rotors RB, a firs comb 61 and a second comb 62 which can move up and down and left and right as viewed in the figure on one side of the rotor group and also over the surfaces of the rotors RA and RB. The comb 60 has comb teeth 60a in the form of rods which are arranged in parallel. The comb 61 likewise has comb teeth 61a in the form of rods which are arranged in parallel.

The combs 60 and 61 are moved in the direction of arrow M so that the comb teeth 60a are placed on the upper side as viewed in the figure of the lower two recesses 43 as viewed in the figure in the four recesses 43 of each rotor RA and the comb teeth 61a are placed on the lower side as viewed in the figure of the upper two recesses 43 as viewed in the figure in the four recesses 43 of each rotor RA. Then, by moving the comb 60 in the direction of arrow O and the comb 61 in the direction of arrow P, the line elements 23 are moved from the recesses 43 of the rotors RA to the recesses 43 of the rotors RB. Upon completion of movement of the line elements 23, the combs 60 and 61 are moved in the direction of arrow N to remove the comb teeth 60a and 61a from the surfaces of the rotors RA and RB.

Figure 33:
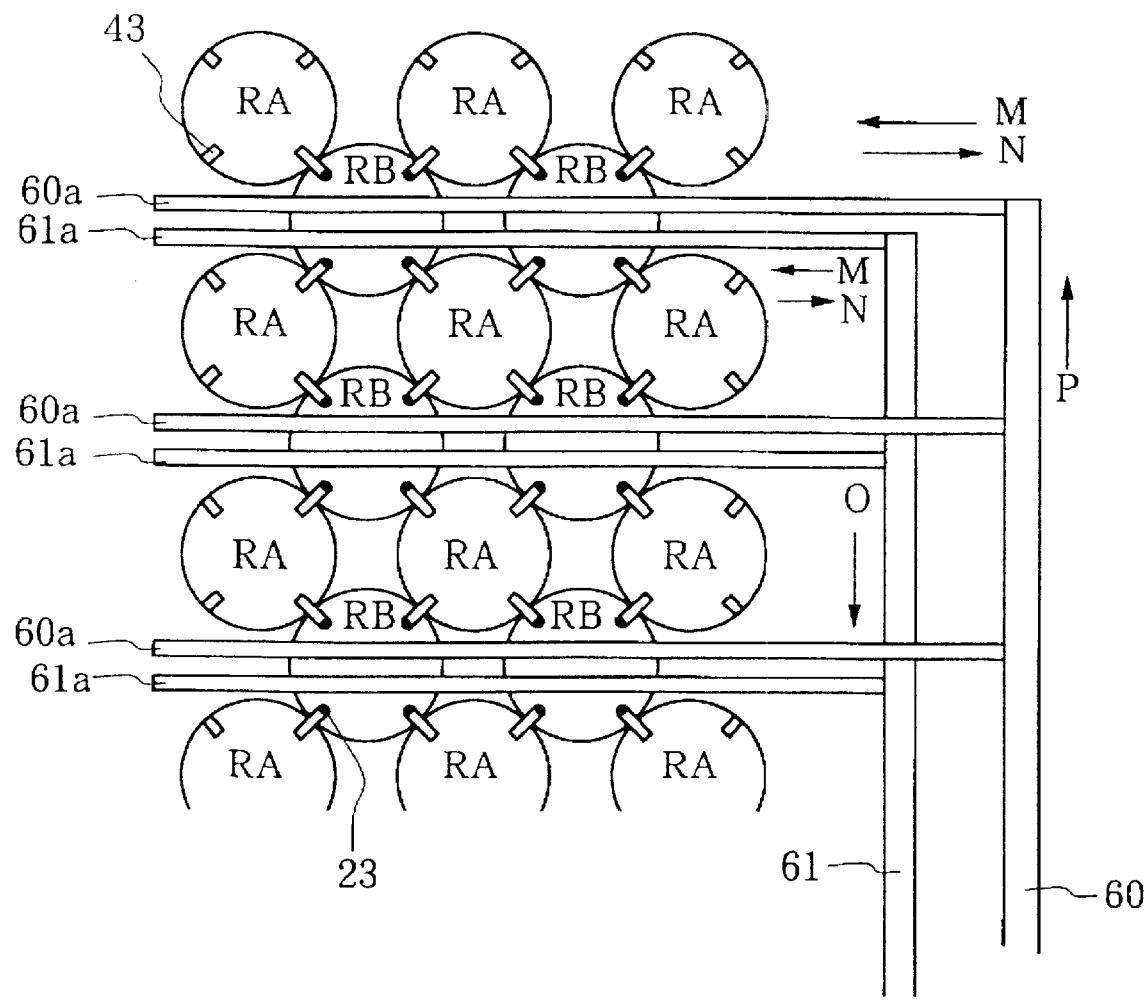
FIG. 33 is a plan view showing another manner of moving the line elements from the rotors RA to the rotors RB.

Then, for moving the line elements 23 from the recesses 43 of the rotors RB to the recesses 43 of the rotors RA, as shown in FIG. 33, the combs 60 and 61 are moved in the direction of arrow M so that comb teeth 60a are placed on the lower side as viewed in the figure of the upper two recesses 43 as viewed in the figure in the four recesses 43 of each rotor RB and the comb teeth 61a are placed on the upper side as viewed in the figure of the lower two recesses 43 as viewed in the figure in the four recesses 43 of each rotor RB. Then, by moving the comb 60 in the direction of arrow P and the comb 61 in the direction of arrow O, the line elements 23 are moved from the recesses 43 of the rotors RB to the recesses 43 of the rotors RA. Upon completion of movement of the line elements 23, the combs 60 and 61 are moved in the direction of arrow N to remove the comb teeth 60a and 61a from the surfaces of the rotors RA and RB.

This method for moving the line elements can be applied also to manufacturing of the three-dimensional net-like structure using three line elements by disposing combs 60 and 61 in three directions at an interval of 60° and operating the combs 60 and 61 in a manner similar to the above described operation.

What is claimed is:

1. A method for manufacturing a packing made of a three-dimensional net-like structure which constitutes an internal structure of a device which performs material transfer, heat exchange or mixing between gases, liquids or gas and liquid, said internal structure being divided in a plurality of chambers or channels connected to one another and said three dimensional net like structure being made of a plurality of unit structures which are arranged continuously in vertical and horizontal directions of the three-dimensional net-like structure, each of the unit structures being a combination of two quadruple pyramids having a common apex (41a) and having bottom surfaces disposed in opposite directions, said method comprising a step of forming the apex (41a) and four sides (41b) of the two quadruple pyramids by converging and diversion of four line elements (23) about a knot which is formed by twisting the four line elements (23).

2. A method for manufacturing a packing made of a three-dimensional net-like structure which constitutes an internal structure of a device which performs material transfer, heat exchange or mixing between gases, liquids or gas and liquid, said internal structure being divided in a plurality of chambers or channels connected to one another and said three dimensional net like structure being made of a plurality of unit structures which are arranged continuously in vertical and horizontal directions, of the three-dimensional net-like structure, each of the unit structures being formed by conversion and dispersion of four line elements, said methods comprising steps of:

(A) preparing a packing manufacturing space by forming a predetermined number of hypothetical channels of a regular square cross-section so that these hypothetical channels align in columns and rows without leaving spaces between them, said hypothetical channels consisting of first hypothetical channels (CA) second hypothetical channels (CB) which are disposed alternately in columns and rows of the hypothetical channels, and disposing, in the packing manufacturing space, a plurality of rotors each having a circular shape in the radial section, being formed with four recesses in the periphery thereof at an interval of 90° for respectively receiving a line element and connected to a rotor control unit and rotatable by a predetermined angle by operating the rotor control unit, said rotors consisting of rotors. (RA) each being disposed in one of the first hypothetical channels (CA) and rotors (RB) each being disposed in one of the second hypothetical channels (CB) in such a manner that the line element can be moved between the recess of the rotor (RA) and the recess of the rotor (RB), (B) inserting the line element unwound from bobbins in the respective recesses of the rotors (RA) and thereafter rotating the rotors (RA) by one revolution or over to twist the fourline elements inserted in the respective recesses of each of the rotors (RA) and thereby forming a first knot (KCA) in each of the hypothetical channels (CA) downstream of the rotors (RA) in a feeding direction of the line elements, (C) feeding the line elements by a predetermined length, moving the line elements form the recesses of the rotors (RA) to the recesses of the rotors (RB) and thereafter rotating the rotors (RB) by the revolution or over to twist the four line elements inserted in the recesses of the rotors (RB) and thereby forming a second knot (KCB) upstream of the first knot (KCA) in each of the hypothetical channels (CB), and (D) feeding the line elements by a predetermined length and moving the line elements from the recesses of the rotors (RB) to the recesses of the rotors (RA).

3. A method for manufacturing a three-dimensional net-like structure including a mist eliminator and a multi-layer filtering film made of a plurality of unit structures which are arranged continuously in vertical and horizontal directions, of the three-dimensional net-like structure, each of the unit structures being a combination of two quadruple pyramids having a common apex (41a) and having bottom surfaces disposed in opposite directions, said method comprising a step of forming the apex (41a) and four sides (41b) of the two quadruple pyramids by converging and diversion of four line elements (23) about a knot which is formed by twisting the four line elements (23).

4. A method for manufacturing a three-dimensional net-like structure including a mist eliminator and a multi-layer filtering film made of a plurality of unit structures which are arranged continuously in vertical and horizontal directions, of the three-dimensional net-like structure, each of the unit structures being formed by conversion and dispersion of four line elements, said method comprising steps of:

(A) preparing a three-dimensional net-like structure manufacturing space by forming a predetermined number of hypothetical channels of a regular square cross-section so that these hypothetical channels align in columns and rows without leaving spaces between them, said hypothetical channels consisting of first hypothetical channels (CA) and second hypothetical channels (CB) which are disposed alternately in columns and rows of the hypothetical channels, and disposing, in the three-dimensional net like structure manufacturing space, a plurality of rotors each having a circular shape in the radial section, being formed with four recesses in the periphery thereof at an interval of 90° for respectively receiving a line element and connected to a rotor control unit and rotatable by a predetermined angle by operating the rotor control unit, said rotors consisting of rotors (RA) each being disposed in one of the first hypothetical channels (CA) and rotors (RB) each being disposed in one of the second hypothetical channels (CB) in such a manner that the line element can be moved between the recess of the rotor (RA) and the recess of the rotor (RB), (B) inserting the line element unwound from bobbins in the respective recesses of the rotors (RA) and thereafter rotating the rotors (RA) by one revolution or over to twist the four line elements inserted in the respective recesses of each of the rotors (RA) and thereby forming a first knot (KCA) in each of the hypothetical channels (CA) downstream of the rotors (RA) in a feeding direction of the line elements, (C) feeding the line elements by a predetermined length, moving the line elements from the recesses of the rotors (RA) to the recesses of the rotors (RB) and thereafter rotating the rotors (RB) by one revolution or over to twist the four line elements inserted in the recesses of the rotors (RB) and thereby forming a second knot (KCB) upstream of the first knot (KCA) in each of the hypothetical channels (CB), and (D) feeding the line elements by a predetermined length and moving the line elements from the recesses of the rotors (RB) to the recesses of the rotors (RA).

* * * * *